US 8,578,400 B2
Nov. 5, 2013

(12) United States Patent
Yamada et al.

(10) Patent No.: US 8,578,400 B2
(45) Date of Patent: Nov. 5, 2013

(54) MEDIA PROCESSING DEVICE FOR PROCESSING MEDIA SUCH AS CDS AND DVDS

(75) Inventors: Koji Yamada, Okaya (JP); Kazuya Oshida, Hara-mura (JP)

(73) Assignee: Seiko Epson Corporation, Tokyo (JP)

( * ) Notice: Subject to any disclaimer, the term of this patent is extended or adjusted under 35 U.S.C. 154(b) by 1540 days.

(21) Appl. No.: 12/214,444

(22) Filed: Jun. 18, 2008

(65) Prior Publication Data

US 2008/0310940 A1  Dec. 18, 2008

(30) Foreign Application Priority Data

Jun. 18, 2007 (JP) .................................. 2007-160743
Jun. 18, 2007 (JP) .................................. 2007-160746

(51) Int. Cl.
*G11B 17/04* (2006.01)
(52) U.S. Cl.
USPC .......................................................... 720/615
(58) Field of Classification Search
USPC .................................. 720/611, 612, 613, 615
See application file for complete search history.

(56) References Cited

U.S. PATENT DOCUMENTS

| 4,952,996 | A | 8/1990 | Nishizawa et al. | |
| 5,910,939 | A | 6/1999 | Shiba et al. | |
| 6,151,285 | A * | 11/2000 | Watanabe et al. | 720/610 |
| 6,321,649 | B1 * | 11/2001 | Vangen et al. | 101/35 |
| 6,400,659 | B1 | 6/2002 | Kitaoka | |
| 6,452,893 | B1 * | 9/2002 | Wahl | 369/178.01 |
| 6,490,232 | B2 * | 12/2002 | Sato | 369/30.34 |
| 6,633,518 | B1 | 10/2003 | Minote | |
| 6,848,113 | B2 * | 1/2005 | Klein | 720/619 |
| 7,020,884 | B2 * | 3/2006 | Choi et al. | 720/613 |
| 7,305,683 | B2 | 12/2007 | Namiki | |
| 7,367,034 | B2 * | 4/2008 | Hara | 720/613 |
| 7,961,563 | B2 | 6/2011 | Nishioka et al. | |
| 2003/0011286 | A1 | 1/2003 | Weisser et al. | |
| 2006/0136940 | A1 | 6/2006 | Nishide et al. | |
| 2007/0280057 | A1 | 12/2007 | Ikeda | |
| 2008/0036844 | A1 | 2/2008 | Hagstrom | |
| 2008/0313663 | A1 | 12/2008 | Oshida et al. | |

FOREIGN PATENT DOCUMENTS

| CN | 1398402 A | 2/2003 |
| EP | 1251504 A2 | 10/2002 |
| EP | 1909476 A2 | 4/2008 |
| JP | 02-001694 A | 1/1990 |
| JP | 05-189862 A | 7/1993 |

(Continued)

OTHER PUBLICATIONS

Extended European Search Report issued Sep. 3, 2009 for Application No. 08011044.8.

*Primary Examiner* — Brian Miller
(74) *Attorney, Agent, or Firm* — Nutter McClennen & Fish LLP; John J. Penny, V; Christopher A. Potts

(57) ABSTRACT

A media processing device enables quick, easy, problem-free removal of processed media while maintaining high media quality. The media processing device, such as a disc publisher 1, has a tray 70 with a stacker unit 71 for storing media M, and a tray holding unit that supports the tray 70 movably between a removal position and a storage position. Overlapping channels and lands are formed on the top of the tray 70 and on the ceiling part of the tray holding unit facing the top of the tray 70.

17 Claims, 30 Drawing Sheets

(56) References Cited

FOREIGN PATENT DOCUMENTS

| | | |
|---|---|---|
| JP | 07-254202 A | 10/1995 |
| JP | 07-272374 A | 10/1995 |
| JP | 11-066669 A | 3/1999 |
| JP | 2000-260172 | 9/2000 |
| JP | 2001-283498 | 10/2001 |
| JP | 2002-237104 A | 8/2002 |
| JP | 2002-352501 A | 12/2002 |
| JP | 2003-187511 A | 7/2003 |
| JP | 2005-25888 | 1/2005 |
| JP | 2005-178267 | 7/2005 |
| JP | 2005-222590 A | 8/2005 |
| JP | 2005-259230 | 9/2005 |
| JP | 2006-103236 A | 4/2006 |
| JP | 2006-127658 A | 5/2006 |
| JP | 2006-179115 A | 7/2006 |
| JP | 2006-202379 | 8/2006 |
| JP | 2006-331534 | 12/2006 |
| JP | 2009-059469 A | 3/2009 |
| WO | 2006/132094 A1 | 12/2006 |

* cited by examiner

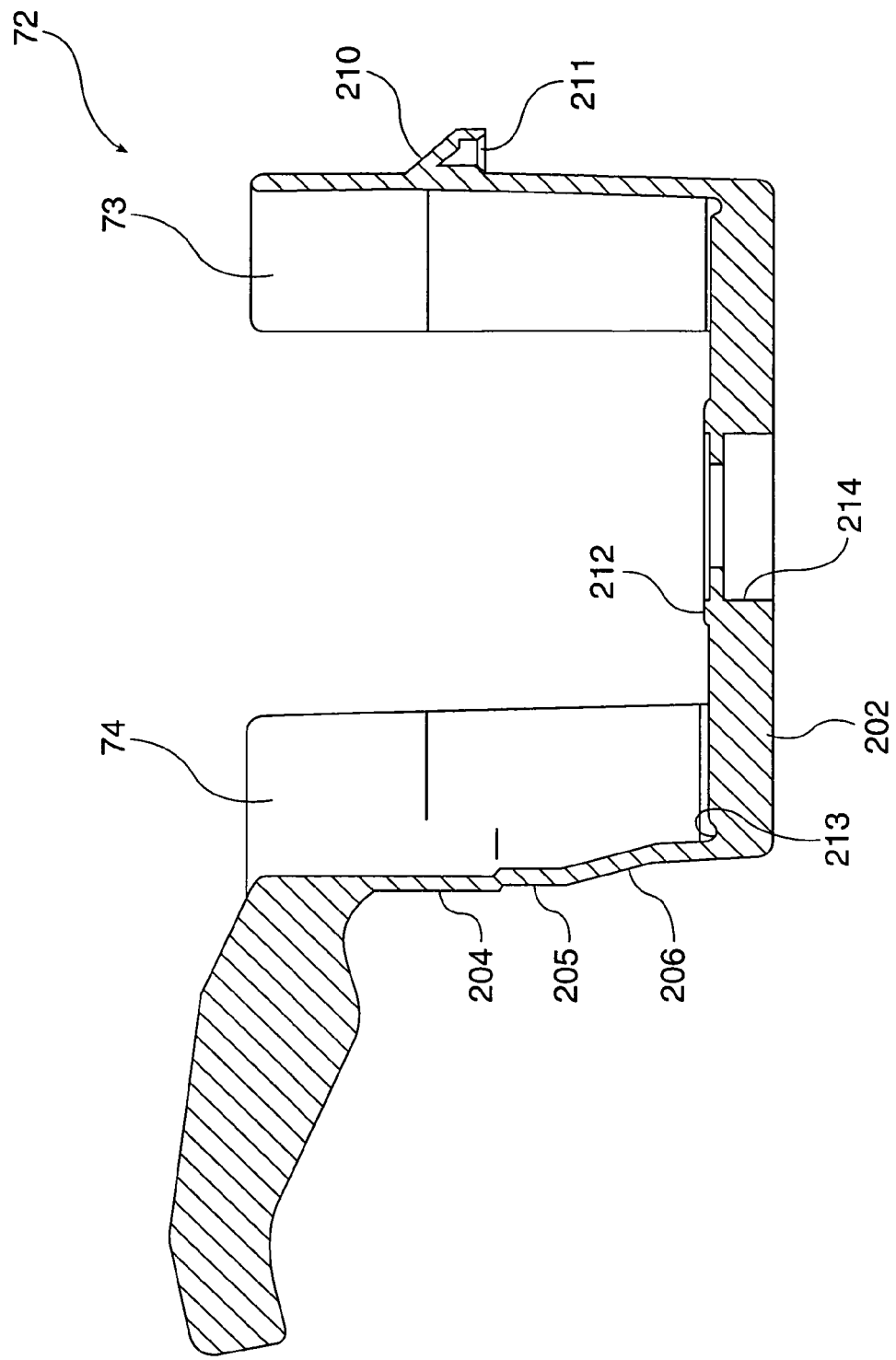

MEDIA PROCESSING DEVICE FOR PROCESSING MEDIA SUCH AS CDS AND DVDS

Priority is claimed under 35 U.S.C. §119 to Japanese Patent Application Nos. 2007-160743 and 2007-160746 filed on Jun. 18, 2007, the disclosure of which incorporated by reference.

BACKGROUND OF THE INVENTION

1. Field of Invention

The present invention relates to a media processing device for processing media such as CDs and DVDs in a specific way.

2. Description of Related Art

Media processing devices such as disc duplicators that write data to large numbers of blank CDs, DVDs, and similar media (also referred to as simply "media" below), and CD/DVD publishers that both write the data and print a label to produce finished media, are now widely available. Such media processing devices generally have a drive for writing data to the media, a printer for printing on the label side of the media, and a media transportation mechanism for gripping and conveying the media to the drive and printer. See, for example, Japanese Unexamined Patent Appl. Pub. JP-A-2006-202379.

Media processing devices such as described above have a stacker for storing numerous discs after they have been processed. A door that opens and closes for removing and inserting the stacker is provided at the front of the media processing device. This enables batch processing a large number of discs.

The user may also want to immediately remove a disc when processing is completed. However, if the user opens the access door to remove the processed disc after the media processing device has already started processing the next disc, user contact with other internal parts could cause a problem, and processing is therefore interrupted when the access door opens. Therefore, if the access door is opened to sequentially remove the finished media when a large number of discs are being batch processed, for example, processing is interrupted every time the door is opened. This increases the time required to finish processing all of the media.

In order to allow the user to sequentially remove media and to handle stacker overflow when the processed media stacker is full, another media processing device known from the literature has a media exit that slopes from inside of the media processing device to the outside. The media transportation mechanism can then drop processed media near the media exit so that the media slide down the slope and exit from the media exit. When the processed media stacker becomes full or media are to be removed sequentially, this arrangement enables removing the processed media without opening the access door.

However, when the media are conveyed to the media exit by sliding the media down a slope, the data side of the media can be scratched as the media slide down the slope, or can collide with other previously discharged media, resulting in damage to the data or the label sides of the media.

Demand for an easier way of removing the stacker has also led to drawer-type stackers that can slide horizontally in and out of the media processing device. A frame for guiding the stacker as it slides is incorporated in this type of media processing device. However, if this drawer-type stacker has been pulled out when the media transportation mechanism drops a disc at the stacker position in order to store a completed disc in the processed media stacker, the disc may drop into the gap between the frame and the stacker. If the disc drops into this gap and the stacker drawer is then pushed into the media processing device, the disc may be trapped or damaged, and could lead to mechanical failure of the media processing device.

SUMMARY OF THE INVENTION

A media processing device according to at least one embodiment of the present invention enables quickly and easily removing finished media without damaging the media.

More particularly, a media processing device according to at least one embodiment of the present invention enables sequentially removing media in the order completed without opening the access door and without damaging the media.

A first aspect of a media processing device according to the present invention has a tray having a stacker for storing media, and a tray holding unit that holds the tray movably between a pulled-out position and a storage position. Alternating land and channel parts are formed on at least part of the opposing surfaces of the tray and the tray holding unit.

This aspect of the invention renders alternating lands and channels that fit and slide together on the opposing surfaces at the top of the tray and the ceiling part of the tray holding unit. There is therefore no gap between the top of the tray and the ceiling part of the tray holding unit, and media will not be trapped between the tray and the tray holding unit when the tray moves. Media will therefore not be trapped and damaged when the tray moves.

Preferably, a channel is formed as the channel part along the direction of tray movement on the surface of the tray facing the tray holding unit, and a protruding part that fits into (matches) said channel is disposed on the surface of the tray holding unit facing the tray.

With this aspect of the invention, the protruding part on the ceiling of the tray holding unit fits into the channel formed in the tray top along the direction of tray movement. As a result, if a disc that could not be stored in the stacker is on top of the tray because the media transportation mechanism dropped a finished disc at the stacker position when the tray was pulled out, the protruding part of the tray holding unit catches the media as the tray moves in to the storage position and thus prevents the disc (media) from entering between the tray and the tray holding unit. Furthermore, because the position of the stacker also moves toward the media caught by the protruding part as the tray moves in, the media is guided so that it slides into and is stored in the stacker.

Yet further preferably, the protruding part disposed on the tray holding unit is disposed on at least one side of the position of the stacker in the direction of tray movement when the tray is housed in the tray holding unit.

With this aspect of the invention, the protruding part is disposed either before or after the stacker in the direction of tray movement when the tray is stored inside the tray holding unit. Therefore, even if media is on top of the tray, moving the tray to the storage position causes the media caught by the protruding part to be guided into the stacker of the tray.

In another aspect of at least one embodiment of the invention the stacker comprises at least one media holding part that holds the outside edge of the media and is formed between the bottom and the open end of the stacker, and the open end of the media holding part of the stacker is larger than the bottom.

With this aspect of the invention, media can be guided along the tapered side wall that widens to the open side of the media holding part of the stacker, and easily stored in the stacker. Furthermore, if the bottom end of the stacker is configured so that media are held by the media holding part with a diameter that is only slightly greater than the outside diameter of the media, the media can be held with effectively no clearance, and the media stacked inside the media holding part will therefore not slide against each other when the tray is pulled out. The media can therefore be held without the surfaces of the media that touch each other being damaged.

Yet further preferably, a first support unit that supports the media in a prescribed area in the center of the media is formed on the bottom of the stacker.

Yet further preferably, the center of the first support unit is recessed and the first support unit is ring-shaped.

With this aspect of the invention, the center of the media at the bottom of the stack in the stacker contacts and is supported stably by the first support unit disposed on the bottom of the stacker. In order to remove the media from the stacker, the user can insert a finger to the recessed part of the first support unit to easily remove the media.

In another aspect of the invention, at least one second support unit positioned at an outside edge surface part of the media is disposed to the bottom of the stacker.

Further preferably, the second support unit is disposed at a position closer to the bottom of the stacker than the first support unit.

This aspect of the invention supports even warped media at the center of the disc at a position outside of the data recording area by the first support unit and at the outside edge area of the media by the media support unit, and can therefore store the media without the second support unit contacting the data recording area or without the second support unit forcefully contacting the data recording area. In addition, if the media enters the stacker at an angle, the media contacts the second support unit and the attitude of the media can be corrected. Furthermore, if the recess in the center part supporting the media is a prescribed height, the media can be easily removed by inserting the fingers and gripping the media.

Further preferably, a media guide part that guides media to the stacker is disposed on the device chassis, the inside diameter of the media guide part on the opposite end of the stacker is greater than the inside diameter of the media guide part at the stacker end, the inside diameter of the end of the stacker open to the media holding part is greater than the inside diameter of the end of the stacker at the media guide part, and the inside diameter of the stacker on the bottom side of the media holding part is substantially equal to the inside diameter of the stacker-side end of the media guide part.

In this aspect of the invention, the media is guided from the large diameter end of the media guide part to the small diameter end, is then discharged from the small diameter bottom end of the media guide part into the large diameter top end of the stacker at the media guide part, and is then guided to the small diameter media holding part at the bottom end of the media holding part of the stacker. As a result, the media can be desirably stored in the media holding part even if the stacker of the tray is at a storage position offset slightly from the media guide part.

Further preferably, the center of the media guide part is on the path of rotation of the media transportation mechanism.

By thus locating the center of the media guide part on the path through which the transportation mechanism pivots at the position where the transportation arm of the transportation mechanism releases the media, the media can be reliably stored at the storage position.

In another aspect of at least one embodiment of the invention, a removal recess is disposed to the bottom part of the stacker.

With this aspect of the invention the media stored in the stacker can also be easily held at the edges and removed without touching the top or bottom surfaces of the media by inserting the fingers to the media access recesses disposed at the bottom of the stacker.

Further preferably, the tray is formed so that the recesses for removing the media are pulled out to the outside when the tray is pulled out from the tray holding unit.

Yet further preferably, a shock absorber is disposed on at least one of a storage limiting part that is disposed on the tray holding unit side and contacts the tray when the tray is stored, and a tray storage stop that is disposed on the tray side and contacts said storage limiting part.

When the tray is closed in this aspect of the invention, the shock absorbers (bumpers) intercede between the tray storage stops of the tray and the storage limiting parts of the tray holding unit. The force of impact when the tray is closed is therefore reduced, and the effect of such impact on the media being processed can be reduced. The quality of media processing can therefore be kept high even if the tray is operated without stopping processing the media.

In another aspect of at least one embodiment of the invention, a shock absorber is disposed on at least one of a pull-out stopping part that is disposed on the tray holding unit side, contacts the tray when the tray is pulled out, and prevents pulling the tray completely out, and a tray pull-out stop that is disposed on the tray side and contacts said pull-out limiting part.

When the tray is pulled out in this aspect of the invention, the shock absorbers intercede between the pull-out stops of the tray and the pull-out stopping parts of the tray holding unit. The force of impact when the tray is pulled out is therefore reduced, and the effect of such impact on the media being processed can be reduced. The quality of media processing can therefore be kept high even if the tray is operated without stopping processing the media.

Another aspect of at least one embodiment of the invention is a media processing device that has a tray having a stacker for storing media, and a tray holding unit that holds the tray movably between a pulled-out position and a storage position. Alternating land and channel parts are formed on at least part of the opposing surfaces of the tray and the tray holding unit, an urging member that pushes toward the side of the tray is disposed on a side part of the tray holding unit, and the side part of the tray that contacts the urging member is sloped so that the width of the tray through said part narrows in the pull-out direction and widens in the storage direction.

This aspect of the invention creates a tapered surface on the side of the tray so that the urging force of the urging member pushes the tray in to the storage position.

With this aspect of the invention, the spring or other urging member disposed to the side of the tray holding unit contacts and applies pressure to the side of the tray so that the tray can be moved without play inside the tray holding unit. The tapered surface disposed in the sliding direction on the side of the tray directs the force of the spring to the inside storage position, and the spring therefore urges the tray to the storage position. The tray can therefore be reliably stored in the storage position and prevented from opening. The media holding parts of the tray can also be easily positioned front-back to the media guide parts.

Preferably, a recess that fits the urging member is disposed at a prescribed position on the side of the tray.

With this aspect of the invention, the recess in the side of the tray engages the spring or other urging member at a prescribed position. This produces a positive click response that tells the user when the recess and the urging member engage and disengage when the tray is pulled out and pushed in. More specifically, the user knows from this engagement click that the tray has reached the end of travel when being pulled out and cannot be pulled out further, or that the tray has reached the end of travel when being pushed in, cannot move further, and is positioned in the desired storage position. If the user continues trying to pull the tray out or push the tray in even though it has already been pulled all the way out or pushed all the way in, the tray or tray holding unit could break and excessive vibration or shock could be applied to the media processing device. If media is being processed by one of the drives or printer or is being transported at this time, this vibration or impact could cause an error, degrade the print quality, cause a media picking error or cause the media transportation mechanism to drop the media. With this aspect of the invention, however, the user can operate the tray at the appropriate position and thereby prevent such problems.

Further preferably, a protruding surface part is disposed to the side of the tray that contacts the urging member at a position offset to the end from the middle part of said side.

This protruding surface part disposed offset from the middle towards the inside and/or outside end of the tray increases the sliding resistance imposed by the spring or other urging member. If the tray is opened or closed forcefully, the increased sliding resistance effectively brakes movement and softens the impact. The user can thus know from the increased sliding resistance that the tray is near the inside end or the front outside end.

Yet further preferably, a roller that rolls against the side of the tray is disposed on the urging member.

Because a roller that rotates in the sliding direction of the tray is disposed on the spring or other urging member and contacts the side of the tray, the sliding resistance caused by contact with the urging member can be reduced. Lubrication is therefore not needed, the tray does not become more difficult to slide due to a loss of lubrication, and the user's hand will also not be soiled by lubricating oil.

The media processing device according to at least one embodiment of the invention has a cabinet in which processing units for recording and/or printing media are disposed, and an access door that opens and closes a space inside the cabinet. The media processing device has a tray and a tray holding unit. The tray has a stacker for storing media processed by the processing unit, and can move between a storage position where the tray is stored inside the cabinet and a removal position where the tray is pulled outside the cabinet. The tray holding unit is located inside the cabinet and supports the tray. The tray is located outside of the area through which the access door moves when opening and closing.

This media processing device enables moving the tray supported in the tray holding unit to the storage position, storing media processed inside the cabinet in the stacker, and then pulling the tray out to a media removal position to remove the processed media. Because the tray is outside of the area of the access door, the tray can be pulled out and the media can be removed without opening the door. Furthermore, because the media can be removed without opening the access door, media being processed will not be touched and the quality of the media being processed is not affected. In addition, because the media can be stored in a stacker inside the cabinet, there is no need for the processed media to slide down a slope in order to be discharged to the outside, and the media will therefore not be damaged.

The tray holding unit preferably has a main frame that can be made of sheet metal and a basically U-shaped drawer frame that can also made of sheet metal and is fastened to the tray side of the main frame.

This arrangement results in a tray holding unit that when seen in section view is a closed structure rendered by fastening the sheet metal tray (drawer) frame to the bottom of the sheet metal main frame, thus assuring the rigidity of the tray holding unit.

In another aspect of at least one embodiment of the invention, a plurality of pins separated from each other along the direction in which the tray moves are disposed protruding from the tray holding unit side, and a guide channel into which these pins are inserted is disposed to the tray along the direction of tray movement.

This aspect of the invention enables the movement of the tray in a stable posture because the plurality of pins disposed on the tray holding unit slide along the guide channel when the tray moves.

In another aspect of at least one embodiment of the invention, a low friction sheet is disposed where the tray holding unit and the tray touch.

The low friction sheet disposed on the tray holding unit side in this arrangement reduces sliding friction with the tray, and thus reduces the sliding resistance of the tray.

Another aspect of at least one embodiment of the invention has a tray storage sensor for detecting if the tray is in the storage position.

Because this arrangement enables the detection of whether the tray is in the storage position by means of the tray storage sensor, media handling, such as determining whether processed media can be carried to the stacker or whether processing should be paused, can be changed based on whether or not the tray is in the storage position.

Another aspect of at least one embodiment of the invention has a media sensor that detects the height of the media stack in the stacker.

Because this arrangement enables the detection of the height of the stacked media stored in the stacker by means of this media sensor, storing media above the maximum allowable height in the stacker unit of the tray can also be prevented. Media stacked above the top of the stacker will therefore not interfere with pulling the tray out, and media stacked above the top of the stacker will not be damaged when the tray is pulled out.

Another aspect of at least one embodiment of the invention preferably has an access unit that opens and closes to the outside and disposed on the cabinet of the media processing device where the tray is stored.

If a foreign object somehow gets inside the storage space for the tray, this aspect of the invention enables the easy removal of the foreign object by opening the access unit to the outside. If a foreign object prevents closing of the tray, this arrangement thus enables easily rectifying the problem.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 30 is a section view of the media stacker.

DESCRIPTION OF PREFERRED EMBODIMENTS

A preferred embodiment of a media processing device according to the present invention is described below with reference to the accompanying figures.

The media processing device of the invention is described below using a media publisher by way of example.

Figure 1:
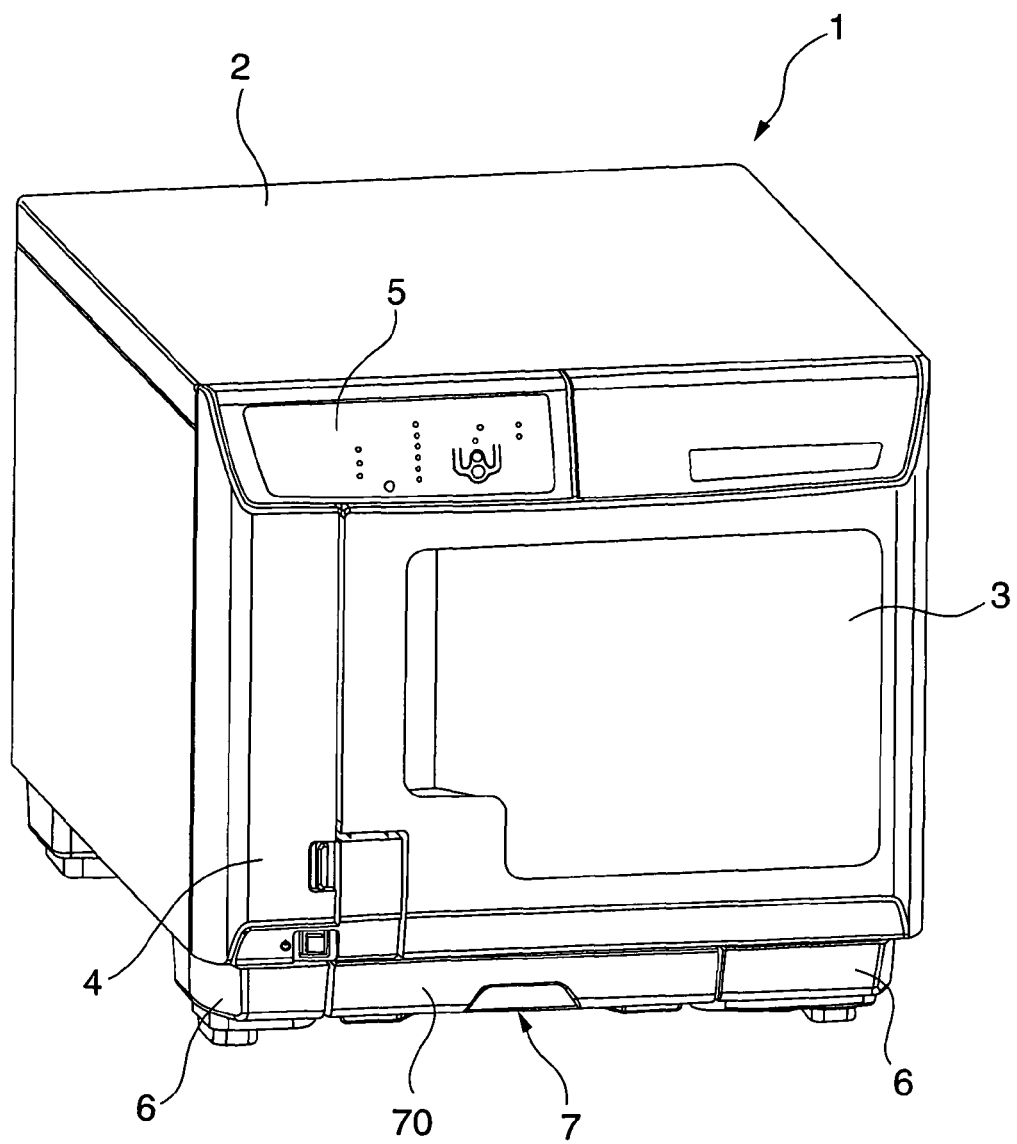
FIG. 1 is an external oblique view of a media publisher (media processing device).

FIG. 1 is an external oblique view of a media publisher (media processing device) when all units are closed.

As shown in FIG. 1, the publisher 1 is a media processing device that writes data and prints on the label side of disc-shaped media such as CDs and DVDs, and has a basically box-shaped case 2. Doors 3 and 4 that open and close to the right and left are attached at the front of the case 2. An operating panel 5 having various indicators and operating buttons is disposed at the top left part of the case 2, and support legs 6 project down from the bottom of the case 2 on both right and left sides. A drawer mechanism 7 is disposed between the right and left legs 6.

The access door 3 on the front right side opens and closes for access to an open area 8 at the front of the publisher 1. The access door 3 is opened and closed for loading unused (blank) media M and removing finished media M from the open area 8.

Figure 3:
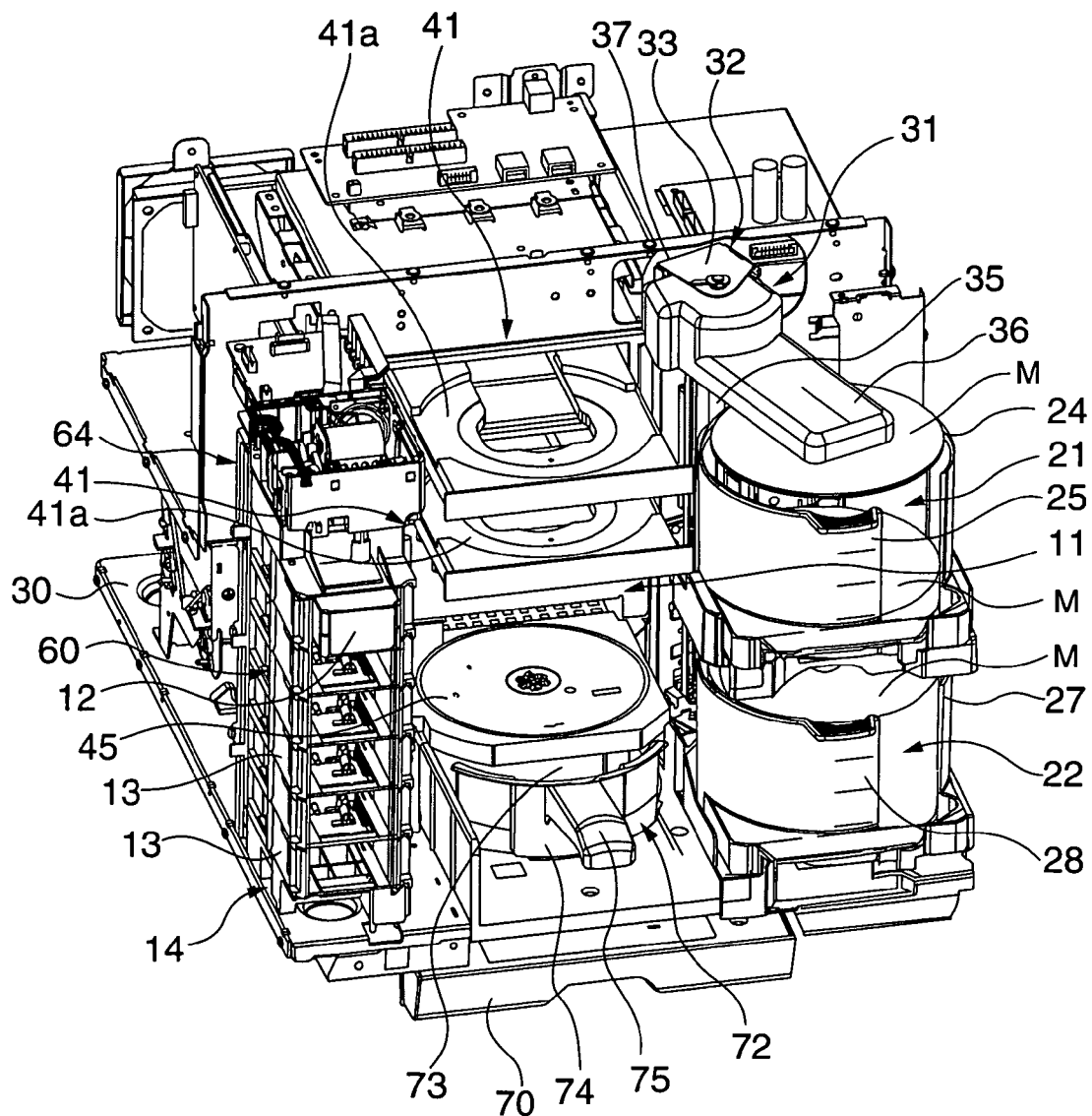
FIG. 3 is an oblique view from the top front side of the publisher with the case removed.
Figure 4:
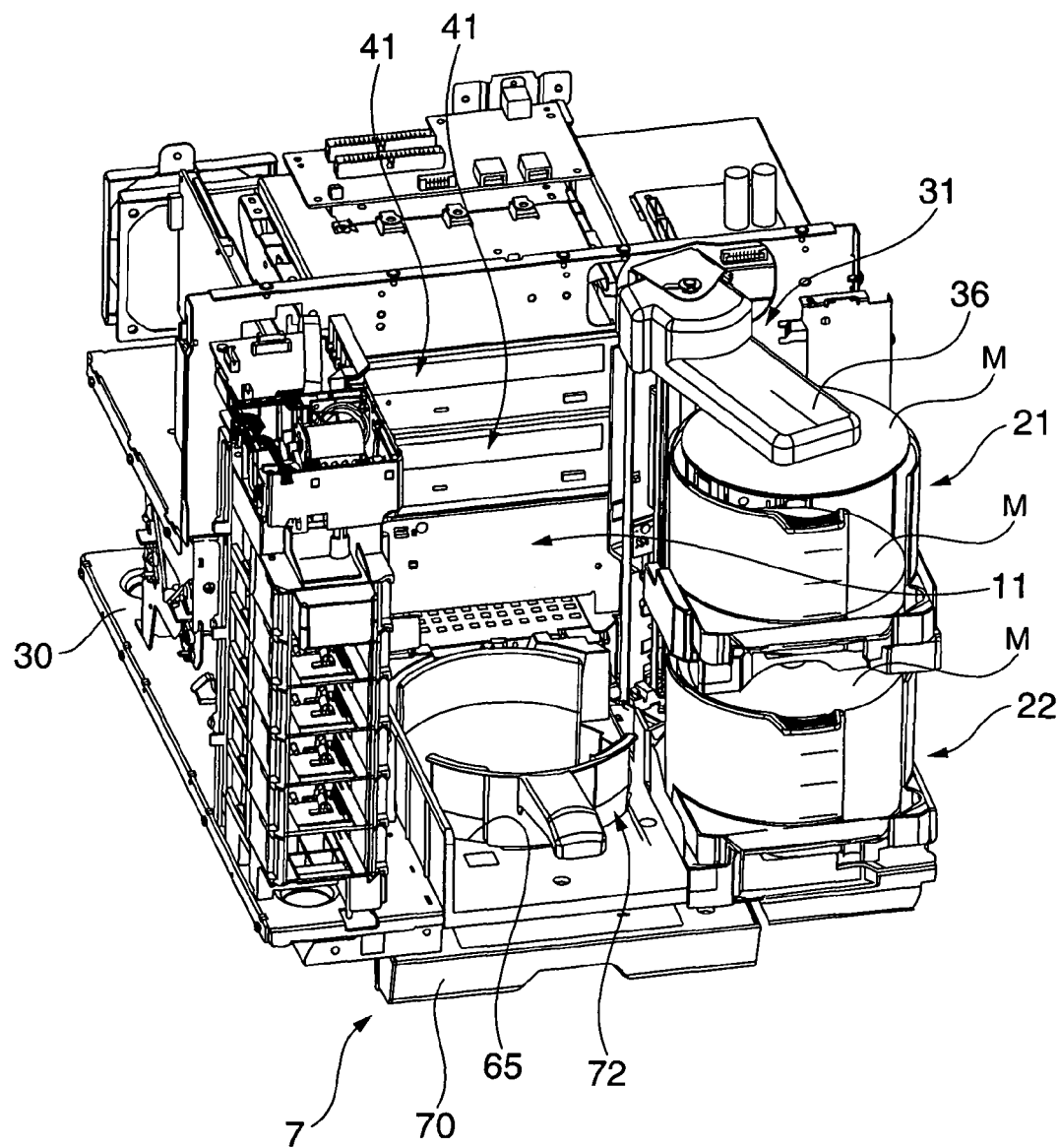
FIG. 4 is an oblique view from the top front side of the publisher with the case removed.
Figure 5:
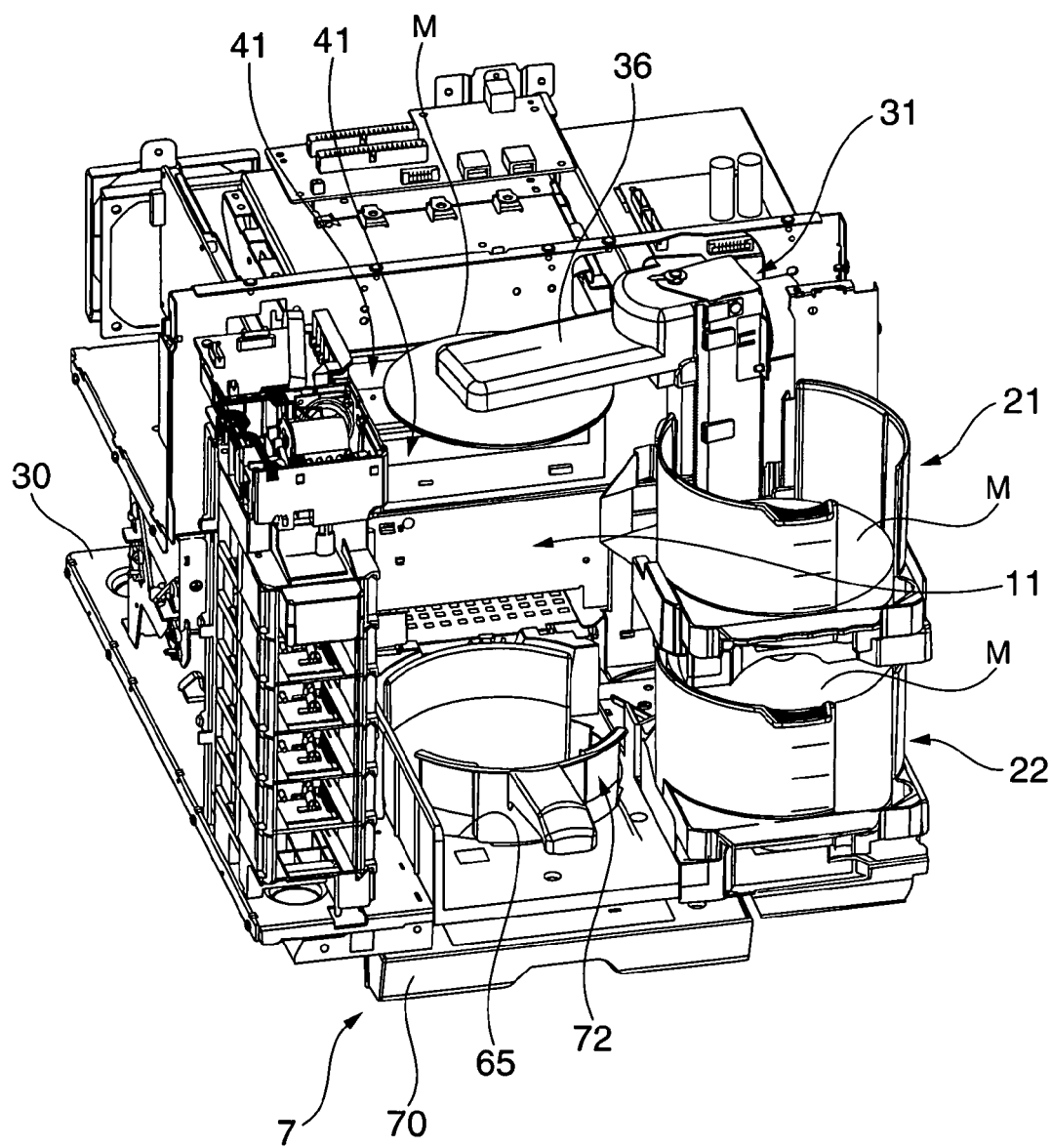
FIG. 5 is an oblique view from the top front side of the publisher with the case removed.
Figure 6:
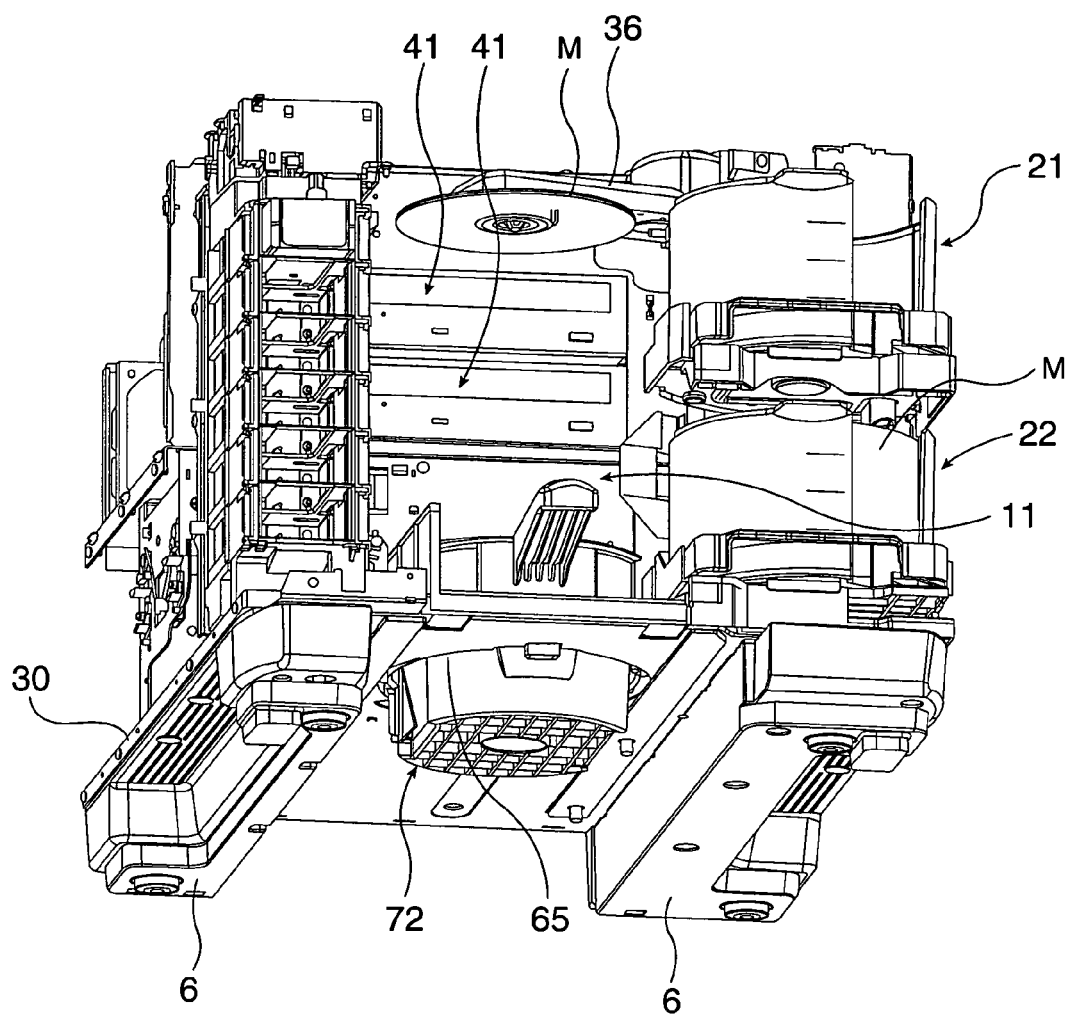
FIG. 6 is an oblique view from the bottom front side of the publisher with the case and part of the drawer mechanism removed.

The access door 4 on the front left side opens and closes for replacing the ink cartridges 12 of the label printer 11 shown in FIG. 3. When the door 4 is open, a cartridge carrier unit 14 with a plurality of cartridge holders 13 arrayed in a vertical stack is exposed.

A media stacker 21 (media storage unit) for holding a plurality of unused blank discs M (such as 50) to which data has not been written in a vertical stack, and a second media stacker 22 for similarly holding a plurality of completed discs M or blank discs M (such as 50) are disposed inside the case 2 of the publisher 1. The blank media stacker 21 and the completed media stacker 22 can be freely installed to and removed from the positions shown in FIG. 2. Media stacker 21 and media stacker 22 are disposed one above the other so that the media M are stored coaxially in the stackers. Both media stacker 21 and media stacker 22 can be freely installed to and removed from predetermined positions.

The top media stacker 21 has a pair of right and left cylindrical side walls 24 and 25. The blank discs M are placed from the top into the blank media stacker 21 between the side walls 24 and 25, which hold the discs in a substantially coaxial stack. The task of storing or adding the blank discs M to the blank media stacker 21 can be done easily by opening the door 3 and pulling the media stacker 21 out.

The bottom media stacker 22 is identically constructed with a pair of right and left curved side walls 27 and 28, enabling the discs M to be inserted from the top and stored in a substantially coaxial stack.

A media transportation mechanism 31 is located behind the media stackers 21 and 22. The media transportation mechanism 31 has a vertical guide shaft 35 disposed between the main frame 30 and the top plate 33 of the chassis 32. A transportation arm 36 is supported so that it can move up and down and rotate on the vertical guide shaft 35. The transportation arm 36 can move vertically up and down along the vertical guide shaft 35 and can pivot right and left on the vertical guide shaft 35 by means of a drive motor 37.

Two media drives 41 are disposed one above the other beside the two stackers 21 and 22 and the media transportation mechanism 31, and the label printer 11 is disposed below the media drives 41.

Each of the media drives 41 has a media tray 41a, which can move between a data writing position where data is recorded to the discs, and a media transfer position where the media can be loaded and unloaded from the media tray 41a.

The label printer 111 also has a media tray 45 that can move between a printing position for printing a label on the label side of the media M, and a media transfer position where the media can be loaded and unloaded from the media tray 45.

FIG. 3 shows the media trays 41a of the top and bottom media drives 41 pulled out to the media transfer position, and the media tray 45 of the label printer 11 at the media transfer position.

The label printer 11 in this example is an inkjet printer that uses color ink cartridges 12 (for six colors, specifically, black, cyan, magenta, yellow, light cyan, and light magenta) as the ink supply mechanism 60. The ink cartridges 12 are installed from the front to the individual cartridge holders 13 of the cartridge carrier unit 14.

A space enabling the transportation arm 36 of the media transportation mechanism 31 to move up and down is formed between the pair of right and left side walls 24 and 25 of the first media stacker 21 and between the pair of right and left side walls 27 and 28 of the second media stacker 22. A space is also formed between the top and bottom media stackers 21 and 22 so that the transportation arm 36 of the media transportation mechanism 31 can pivot horizontally for positioning directly above the bottom media stacker 22. When media trays 41a are pushed into the media drives 41, the transportation arm 36 of the media transportation mechanism 31 descends and can access the media tray 45 of the label printer 11 at the media transfer position.

When both media trays 41a are in the data writing position and the media tray 45 for the label printer 11 is at the inside printing position, the transportation arm 36 of the media transportation mechanism 31 can descend below the height of the printer media tray 45. A guide hole 65 (see FIG. 2) further described below is below the media transfer position of the printer media tray 45, and the transportation arm 36 can descend to this position.

The guide hole 65 is a hole that allows the transportation arm 36 to descend and release a disc M so that the disc passes through the guide hole 65. A separate media stacker further described below can also be installed in this guide hole 65.

Figure 2:
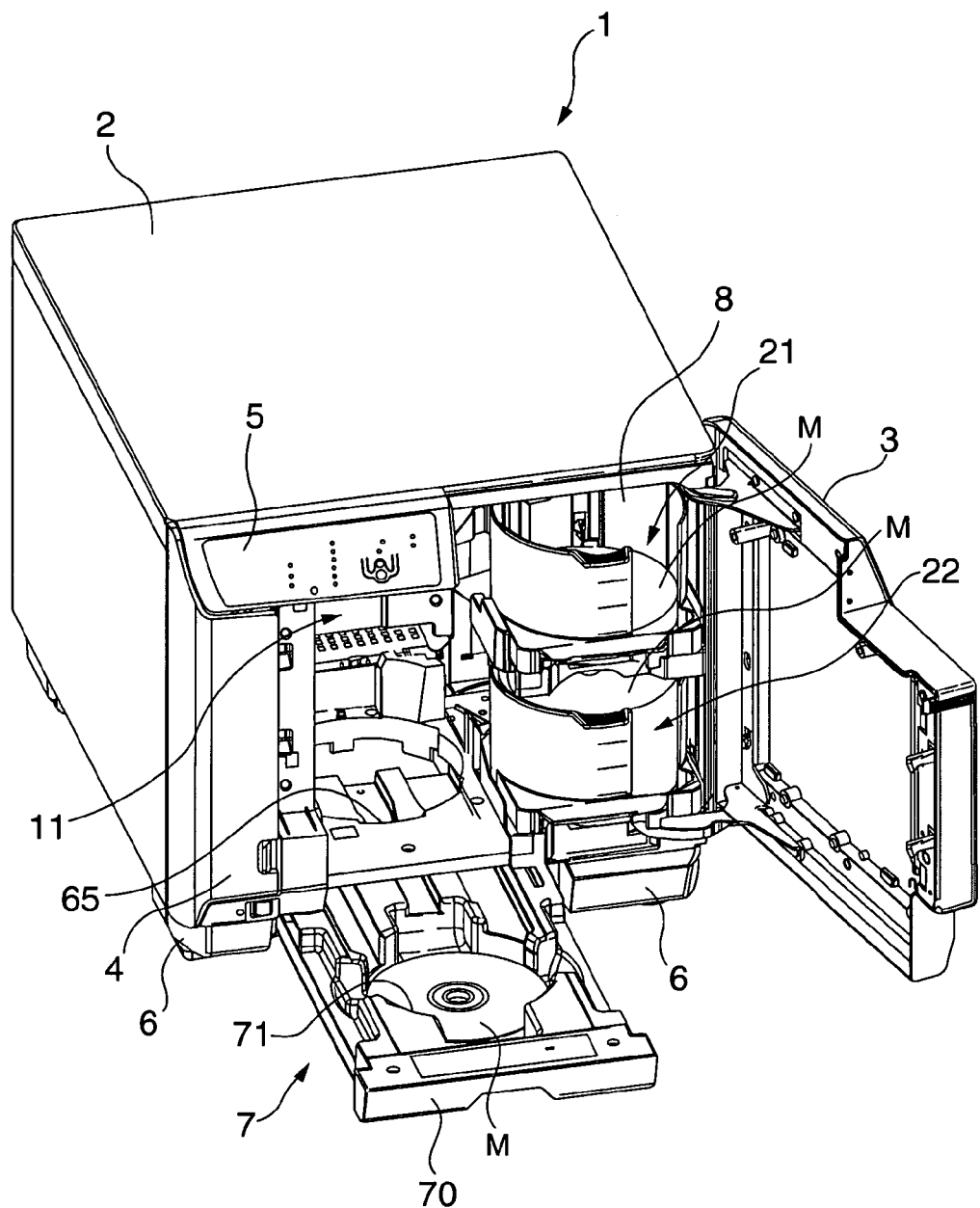
FIG. 2 is an external oblique view of the publisher with the access doors and tray open.

As shown in FIG. 2, the drawer mechanism 7 has a tray 70 disposed below the main frame 30 so that the tray 70 can slide into and out of the main frame 30. The tray 70 has a recess in which a stacker unit 71 can store the media M. When this tray 70 is in the stored (closed) position, the stacker unit 71 is positioned below the guide hole 65, and the center of the stacker unit 71 is positioned with the center of the stacker unit 71 coaxial to the center axis of the media trays 41a and the printer media tray 45 in the media transfer position. The stacker unit 71 accepts media M guided thereinto by the guide hole 65 on the main frame 30 side, and stores a relatively small number of media M (such as 5 to 10). The stacker unit 71 accepts the media M from the open side and stores the media M stacked coaxially from the bottom of the stacker.

A different media stacker 72 (removable media stacker) that can hold more media M than the stacker unit 71 is removably disposed in the guide hole 65 (see FIG. 3). This media stacker 72 also has two curved side walls 73 and 74. Media M can be loaded from the open top between the side walls 73 and 74, and a plurality of media M (such as 50) can be stored coaxially in a stack from the bottom of the media stacker 72. A gap enabling the transportation arm 36 of the media transportation mechanism 31 to move up and down is also formed between the pair of curved side walls 73 and 74. A handle 75 that is held by the user when installing and removing the media stacker 72 is disposed at the top part of the one side wall 74.

When the media stacker 72 is installed as shown in FIG. 4 to FIG. 7, a blank disc M is taken from the bottom media stacker 22, written and printed by a media drive 41 and the label printer 11, and then deposited in the media stacker 72.

When both the top media stacker 21 and the bottom media stacker 22 are loaded to capacity (50 discs each in this embodiment of the invention) with blank media M, all media M (50) in the bottom media stacker 22 are sequentially processed and stored in the media stacker 72, and all media M (50) in the top media stacker 21 are then sequentially processed and stored in the emptied bottom media stacker 22. This enables batch processing the maximum number of media M (50+50) that can be loaded in the top media stacker 21 and the bottom media stacker 22 in a single operation (the "batch processing mode").

Figure 8:
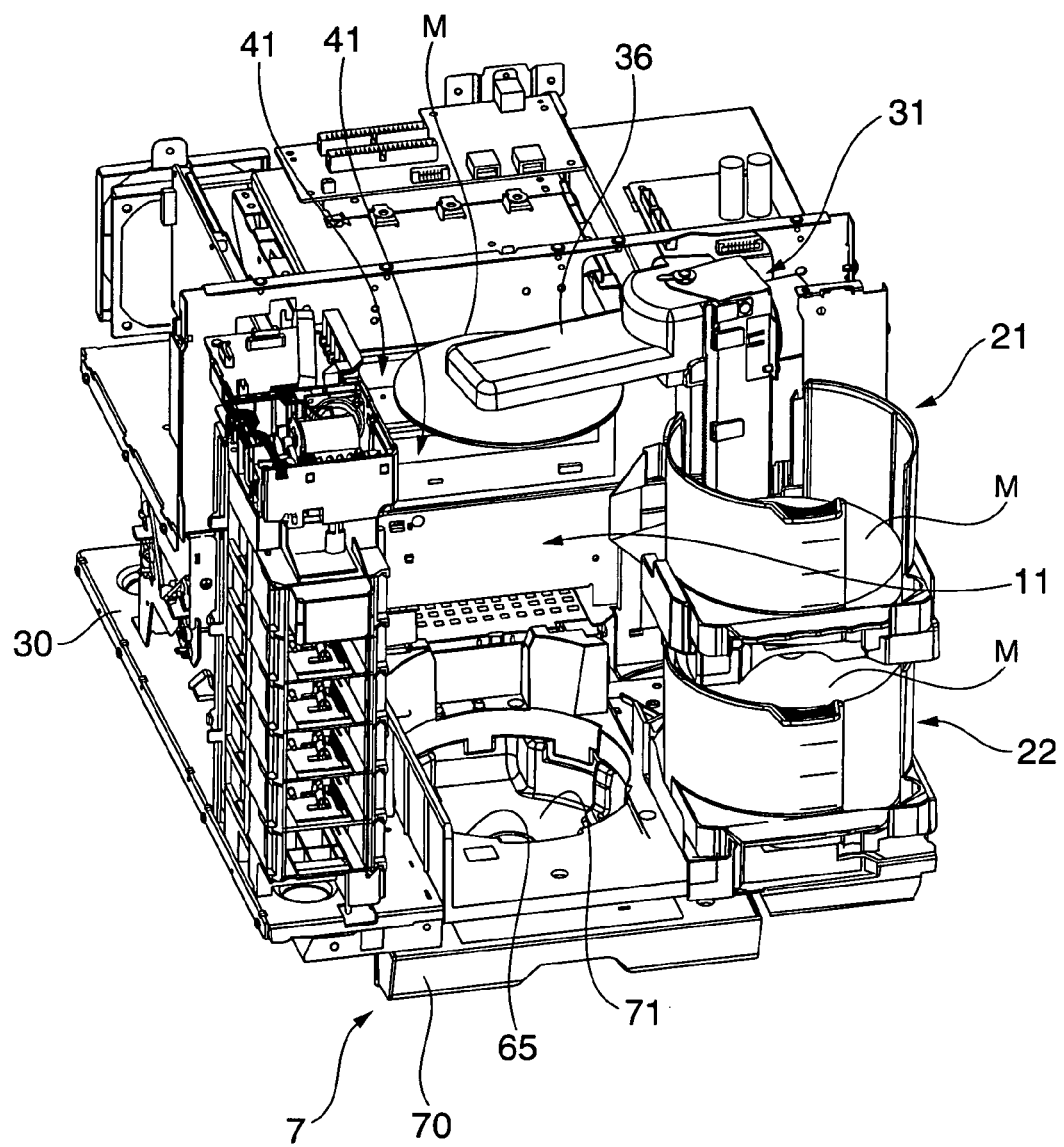
FIG. 8 is an oblique view from the front top of the publisher with the case removed.
Figure 9:
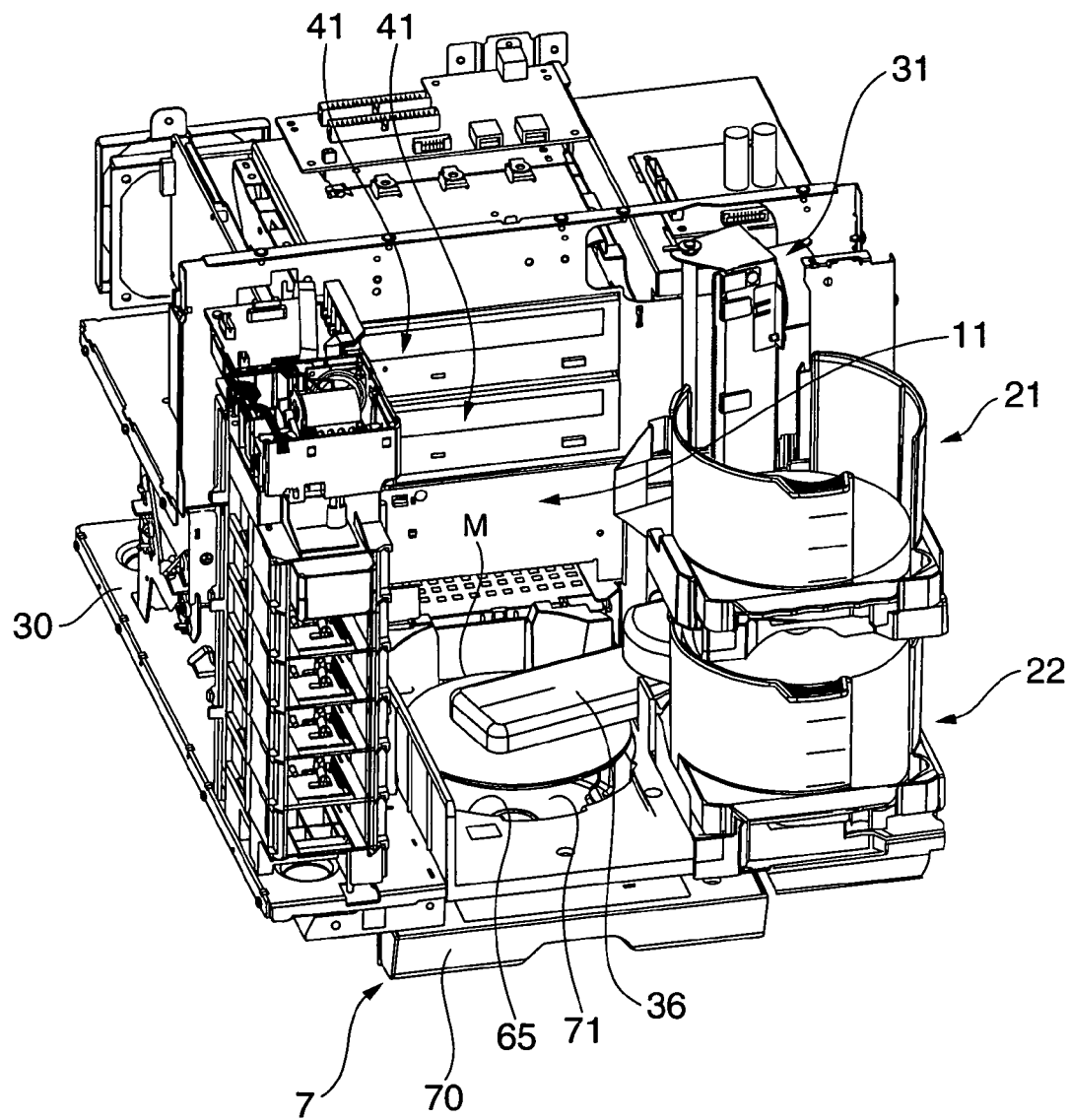
FIG. 9 is an oblique view from the bottom front side of the publisher with the case and part of the drawer mechanism removed.
Figure 10:
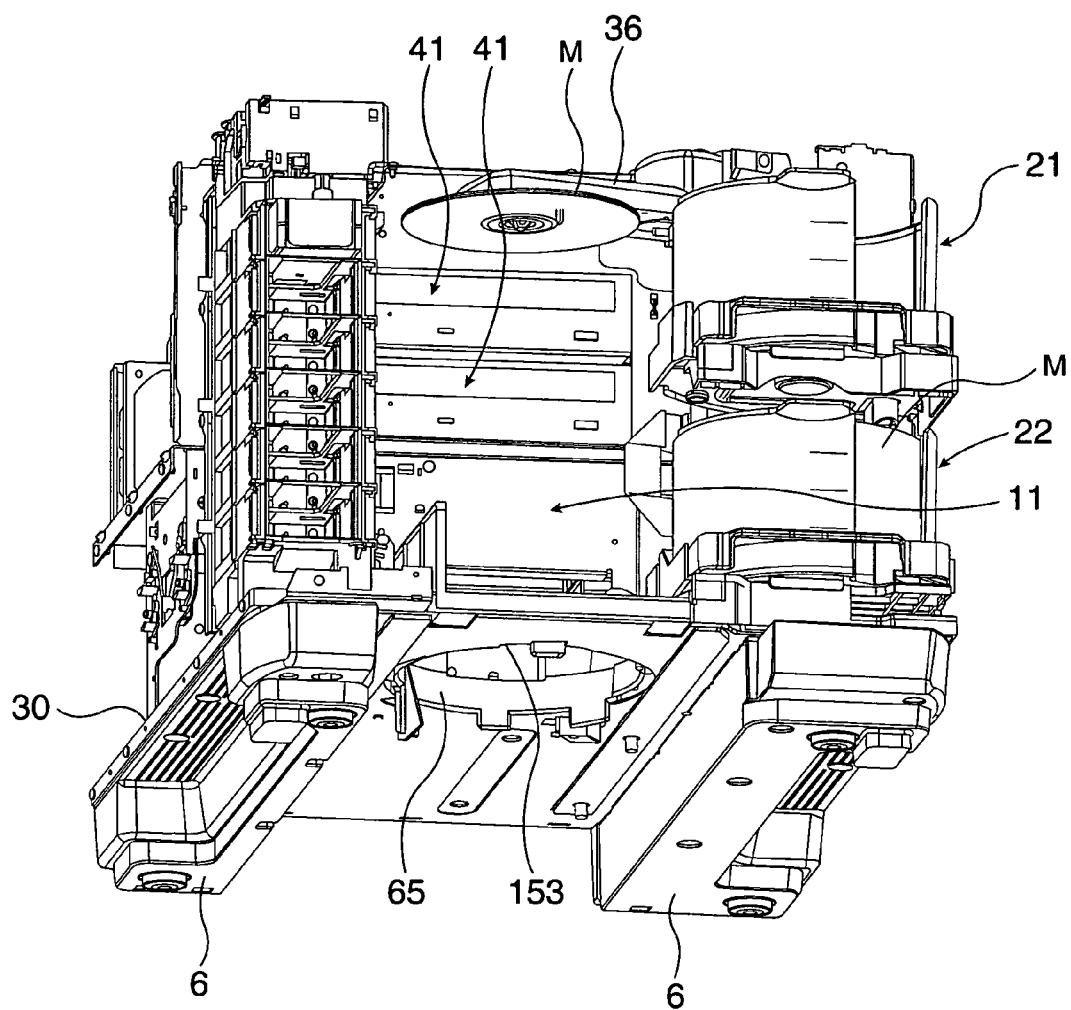
FIG. 10 is an oblique view from the bottom front of the publisher with the case removed.

As shown in FIG. 8 to FIG. 10, when the media stacker 72 is removed, a blank disc M can be removed from the top media stacker 21 or the bottom media stacker 22, the disc can be written and printed by the media drive 41 and label printer 11, the completed disc can be stored in the stacker unit 71 of the tray 70 in the stored (closed) position, and the tray 70 can be pulled out to remove the disc(s).

Figure 11:
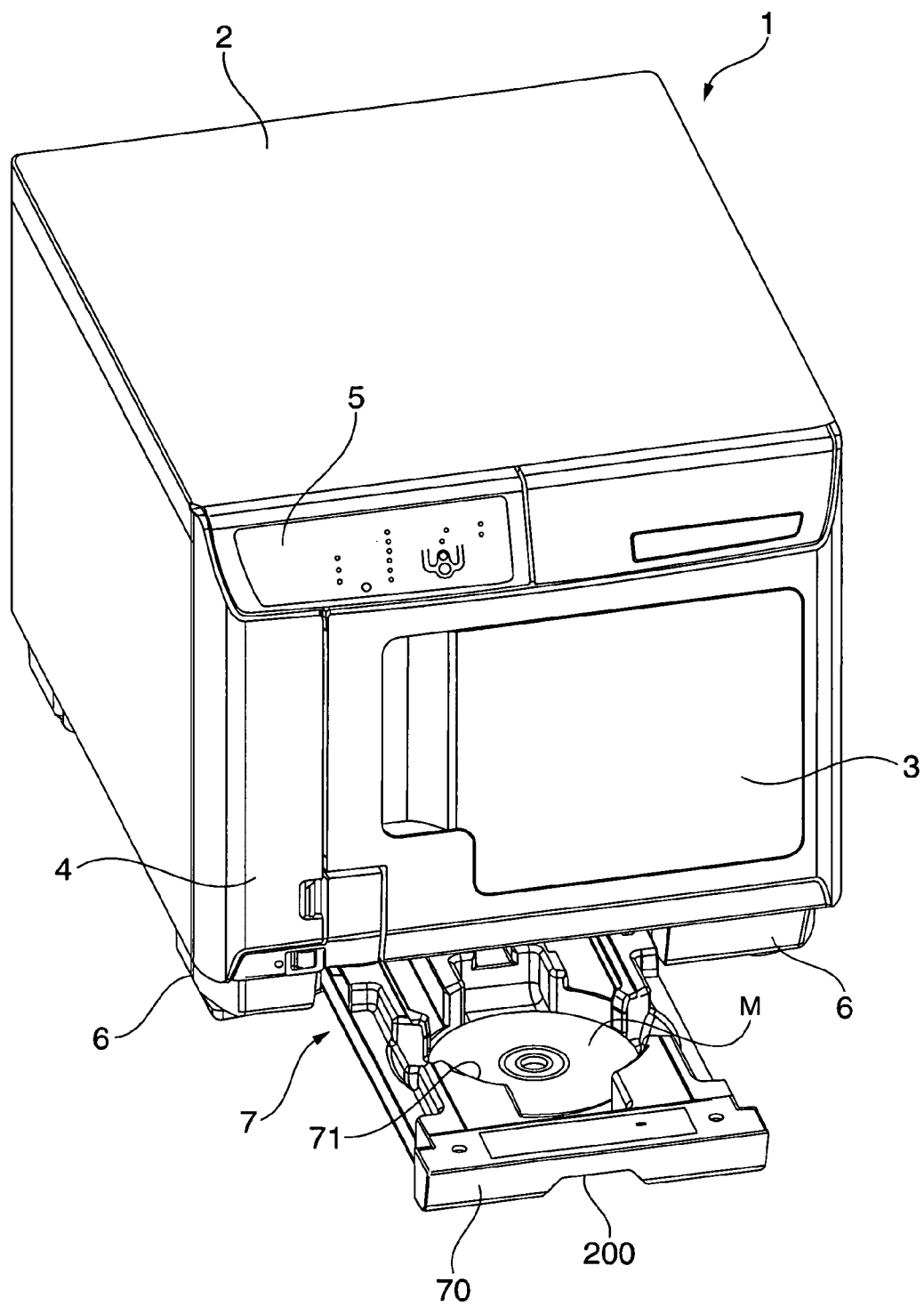
FIG. 11 is an oblique view of the publisher with only the tray open.

The tray 70 can be pulled out as shown in FIG. 11 so that the completed media M can be removed from the stacker unit 71. More specifically, completed media M can be sequentially removed one by one or plural discs at a time while processing other media M continues and the access door 3 remains closed. This is also referred to herein as the "external discharge mode."

The transportation arm 36 of the media transportation mechanism 31 can thus grip and release media M, and the transportation arm 36 can move up and down and pivot right and left in various combinations of motions to access different positions. As a result, the media transportation mechanism 31 can carry media M between the top media stacker 21, the bottom media stacker 22, the stacker unit 71 (or media stacker 72) of the tray 70, the media trays 41a of the media drives 41, and the printer media tray 45 of the label printer 11.

Figure 12:
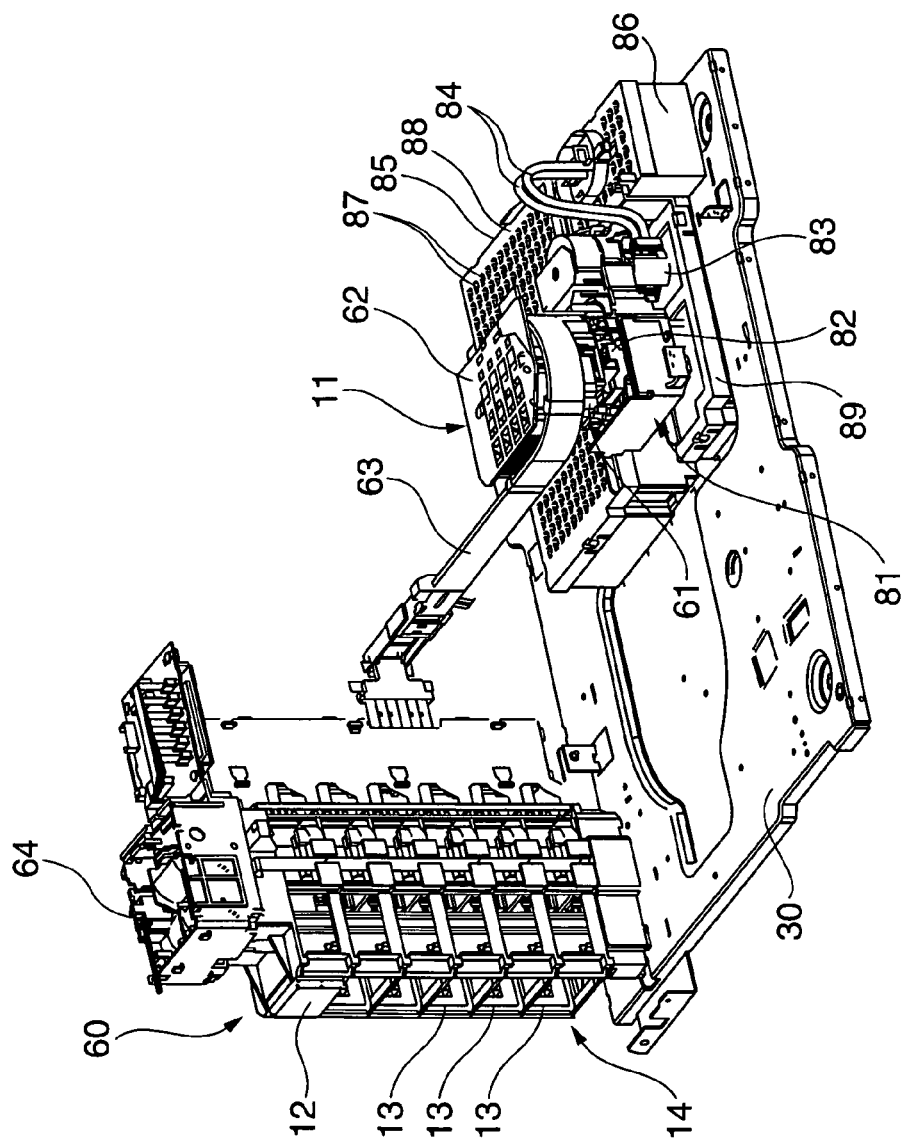
FIG. 12 is an oblique view of the label printer assembly incorporated in the publisher.

As shown in FIG. 12, the label printer 11 has a carriage 62 with an inkjet head 61 having nozzles (not shown in the figure) for discharging ink. The carriage 62 moves bidirectionally horizontally along a carriage guide shaft (not shown in the figure) by means of the drive power from a carriage motor (not shown in the figure).

The label printer 11 has an ink supply mechanism 60 with a cartridge carrier unit 14 in which the ink cartridges 12 are installed. The ink supply mechanism 60 is vertically constructed and is attached perpendicularly to the main frame 30 of the publisher 1. One end of a flexible ink supply tube 63 is connected to the ink supply mechanism 60, and the other end of the ink supply tube 63 is connected to the carriage 62.

Ink in the ink cartridges 12 loaded in the ink supply mechanism 60 is supplied through the ink supply tube 63 to the carriage 62. The ink is supplied to the inkjet head 61 through the damper unit and back pressure adjustment unit (not shown in the figure) disposed to the carriage 62, and discharged from the ink nozzles (not shown in the figure).

A pressurizing mechanism 64, which is disposed to the top of the ink supply mechanism 60, supplies compressed air to pressurize the inside of the ink cartridge 12 and expels ink from the ink pack in the ink cartridge 12.

A head maintenance mechanism 81 is disposed below the home position (shown in FIG. 12) of the carriage 62.

The head maintenance mechanism 81 has a head cap 82 and a waste ink suction pump 83. The head cap 82 covers the ink nozzles of the inkjet head 61 exposed below the carriage 62 in the home position. The waste ink suction pump 83 vacuums ink discharged into the head cap 82 by the ink charging operation and the head cleaning operation of the inkjet head 61.

Ink that is removed by the waste ink suction pump 83 of the head maintenance mechanism 81 is discharged through another tube 84 into the waste ink absorption tank 85. This waste ink absorption tank 85 is an absorbent material not shown that is disposed inside the case 86, and has a cover 88 with numerous ventilation holes 87.

A waste ink catch pan 89 that is a part of the waste ink absorption tank 85 is disposed below the head maintenance mechanism 81 to catch and absorb ink that drips from the head maintenance mechanism 81 with an absorbent material.

A control unit not shown that controls the publisher 1 determines if the doors 3 and 4 are open or closed based on a detection signal from a door sensor not shown. If either of the doors 3 and 4 opens while the media transportation mechanism 31 or label printer 11 is operating, the control unit stops the media M transportation operation, the data writing operation of the media drive 41, and the printing operation of the label printer 11. More specifically, both media M printing and transportation operations are restricted when a door is open. Operation resumes when both doors 3 and 4 are closed.

The drawer mechanism 7 and surrounding parts are described next.

Figure 13:
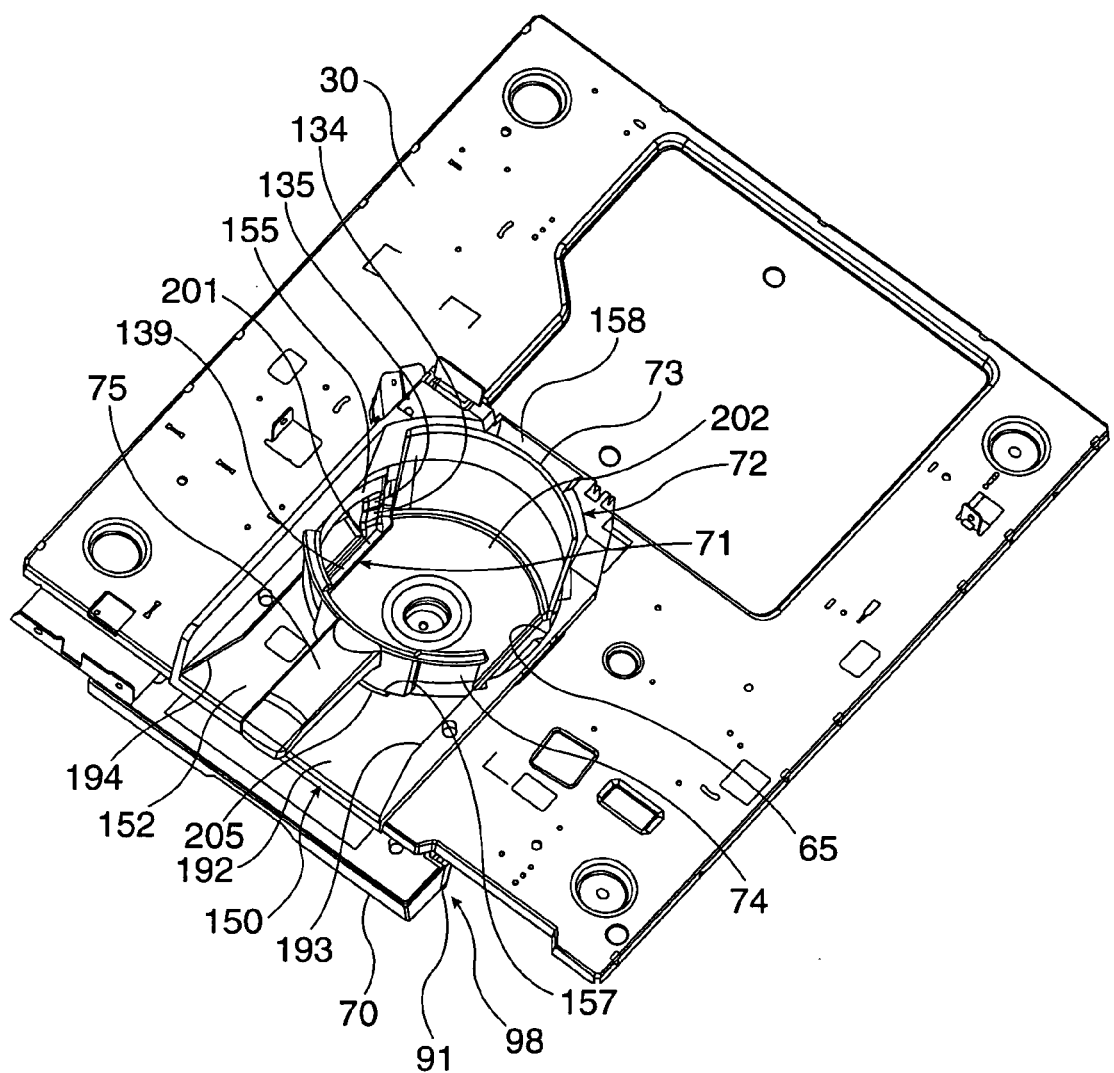
FIG. 13 is an oblique view of the main frame.
Figure 14:
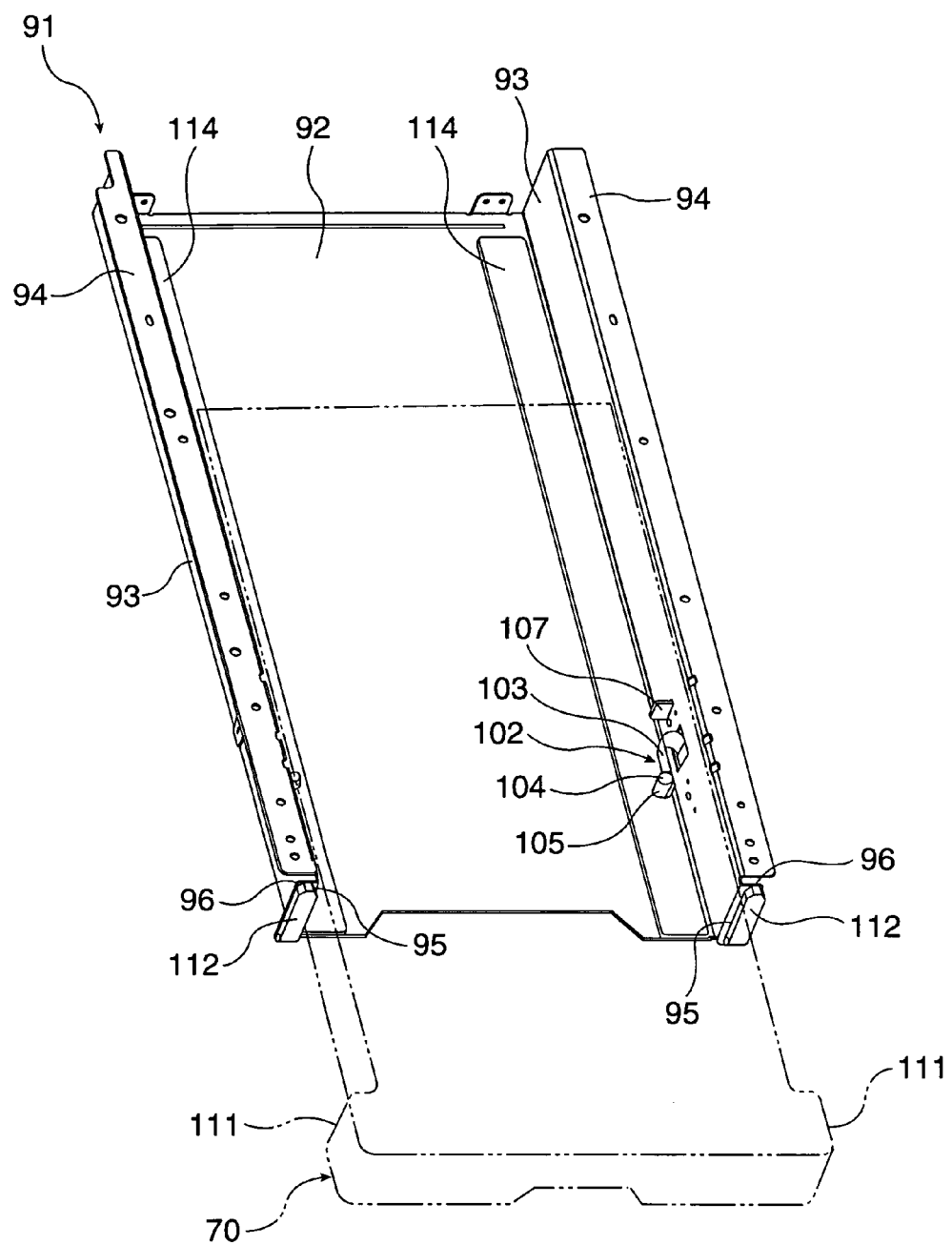
FIG. 14 is an oblique view of the recessed frame and tray.
Figure 15:
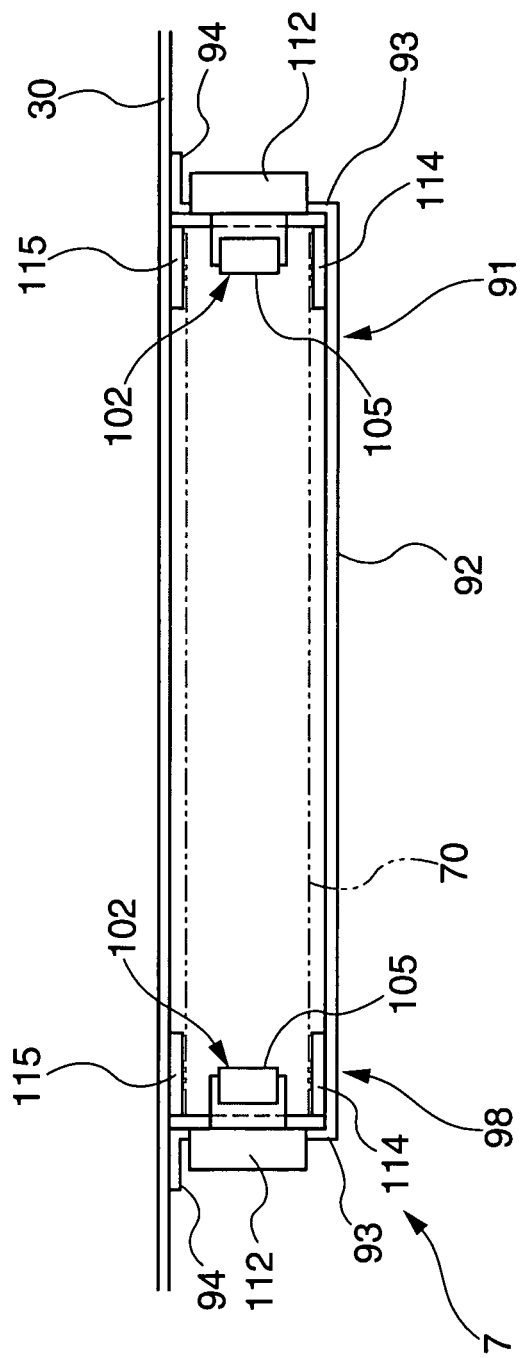
FIG. 15 is a frontal view of the tray holding unit.
Figure 16:
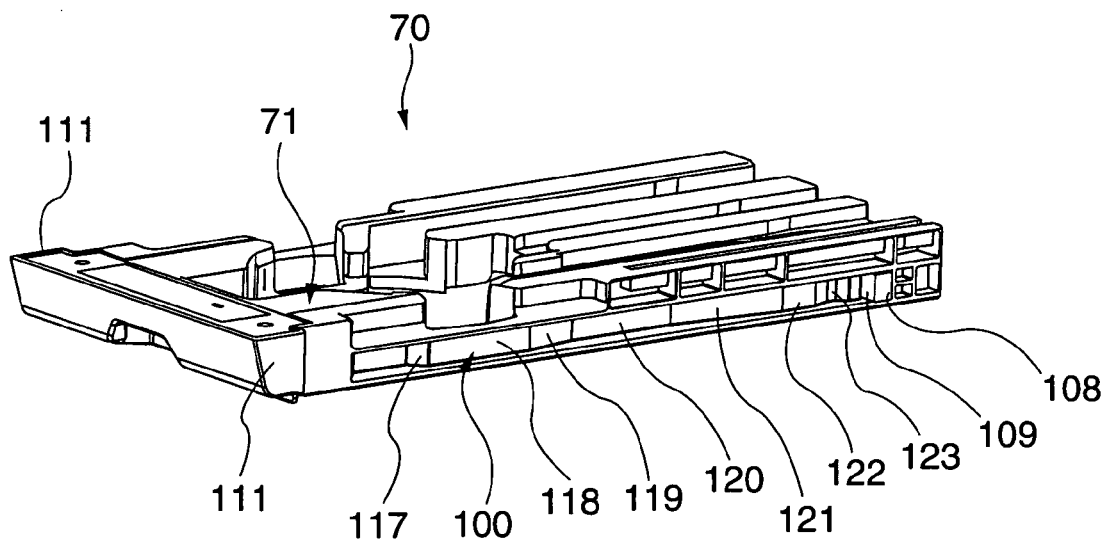
FIG. 16 is an oblique view of the tray.
Figure 17:
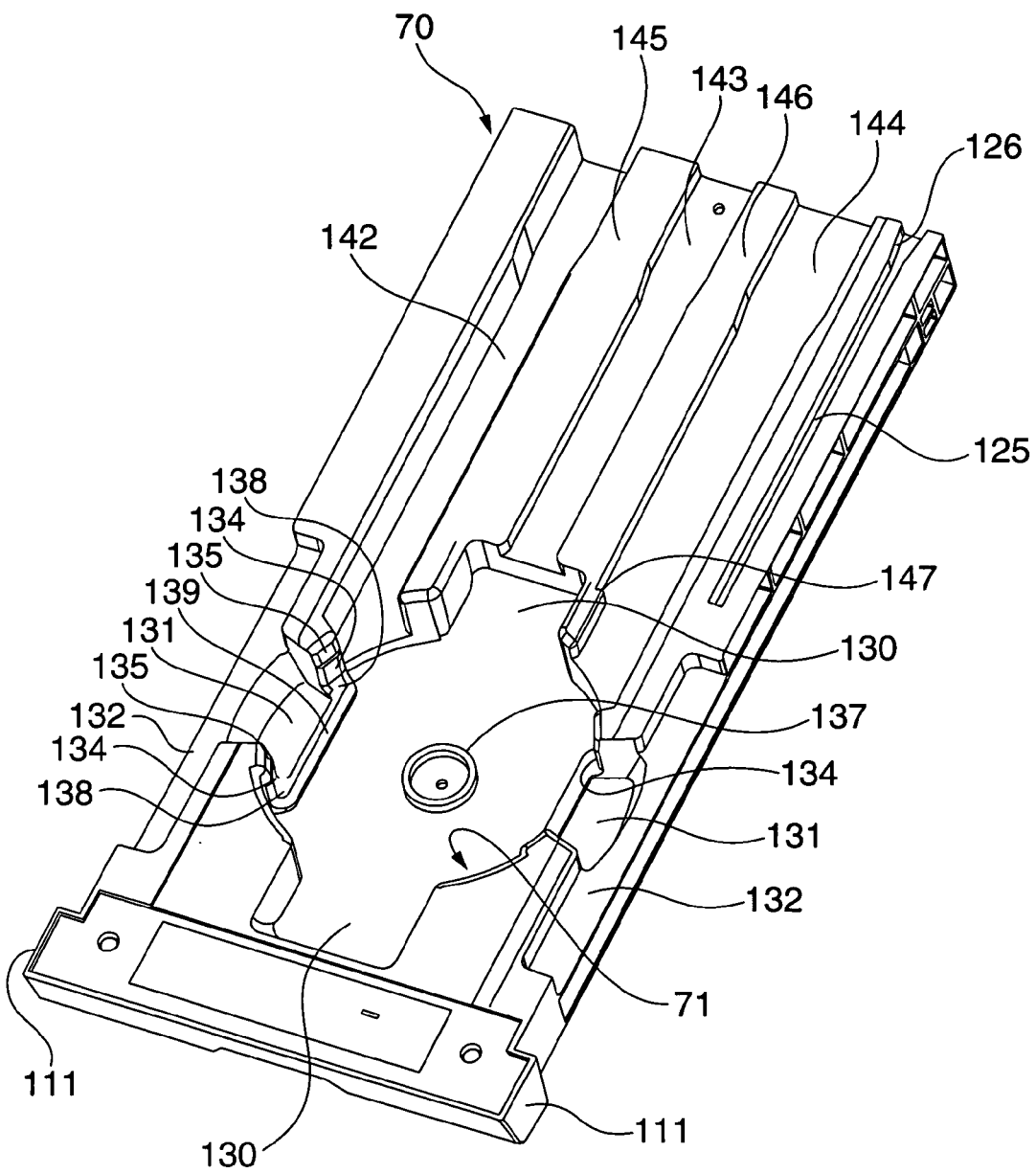
FIG. 17 is an oblique view of the tray from a different angle.
Figure 18:
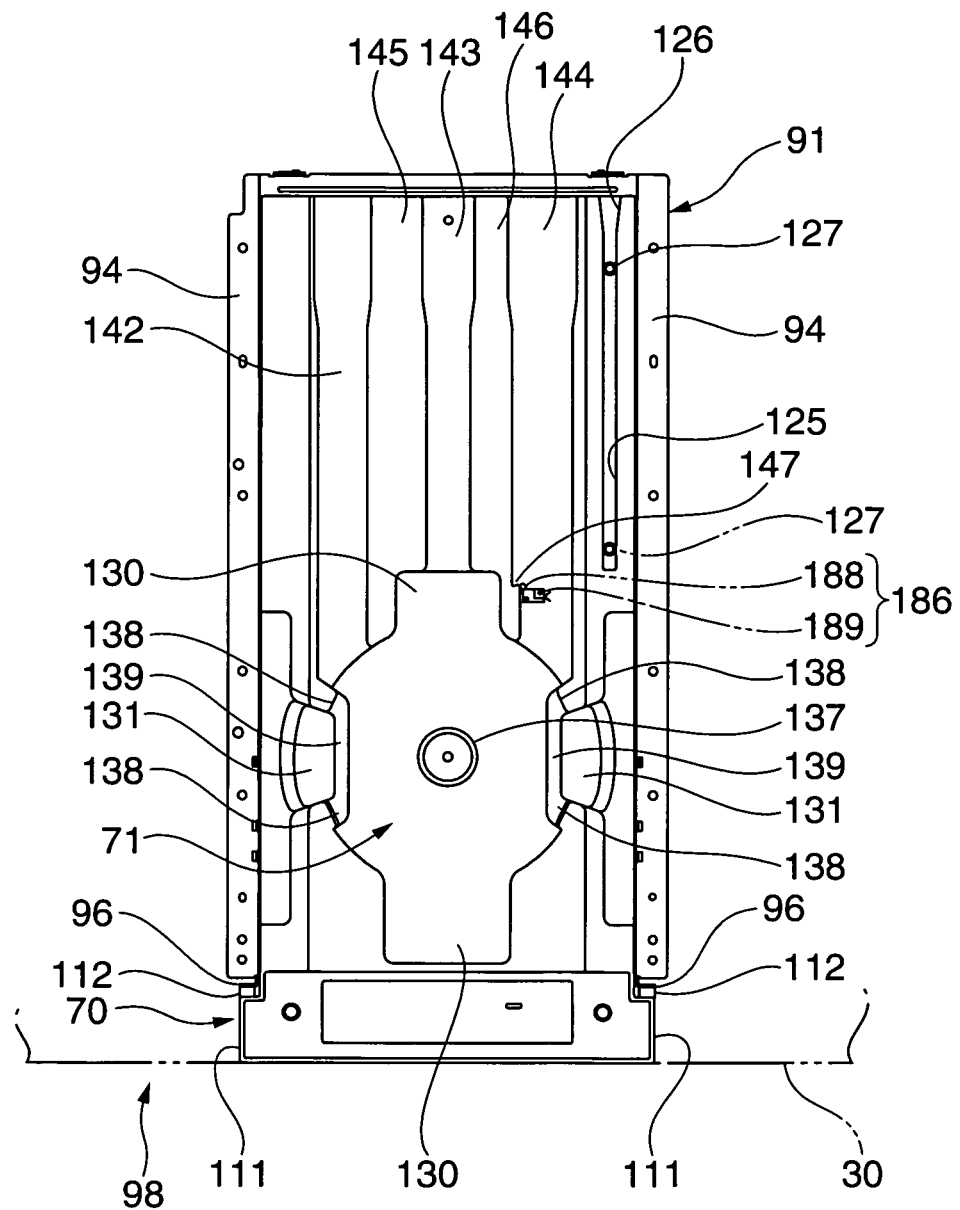
FIG. 18 is a plan view showing the tray when stored in the tray holding unit.
Figure 19:
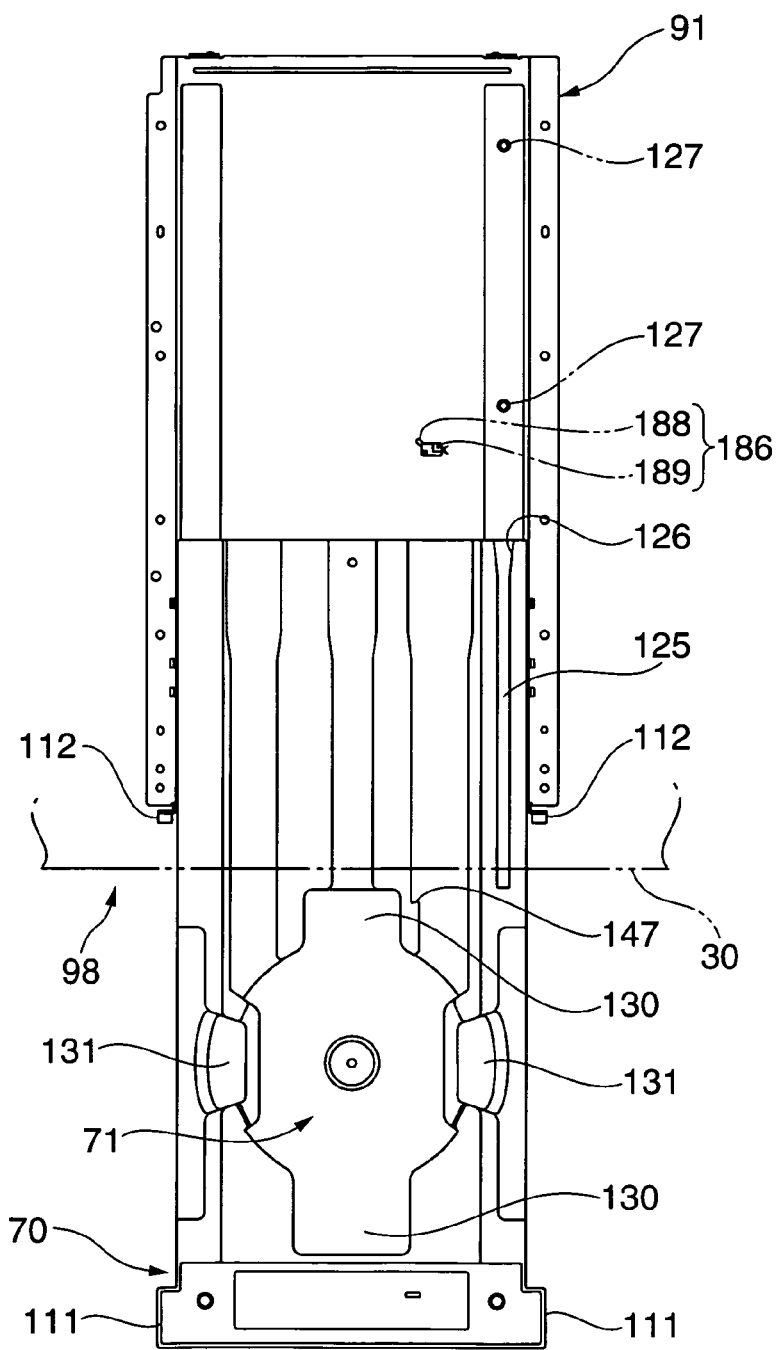
FIG. 19 is a plan view of the tray when pulled out from the tray holding unit.
Figure 20:
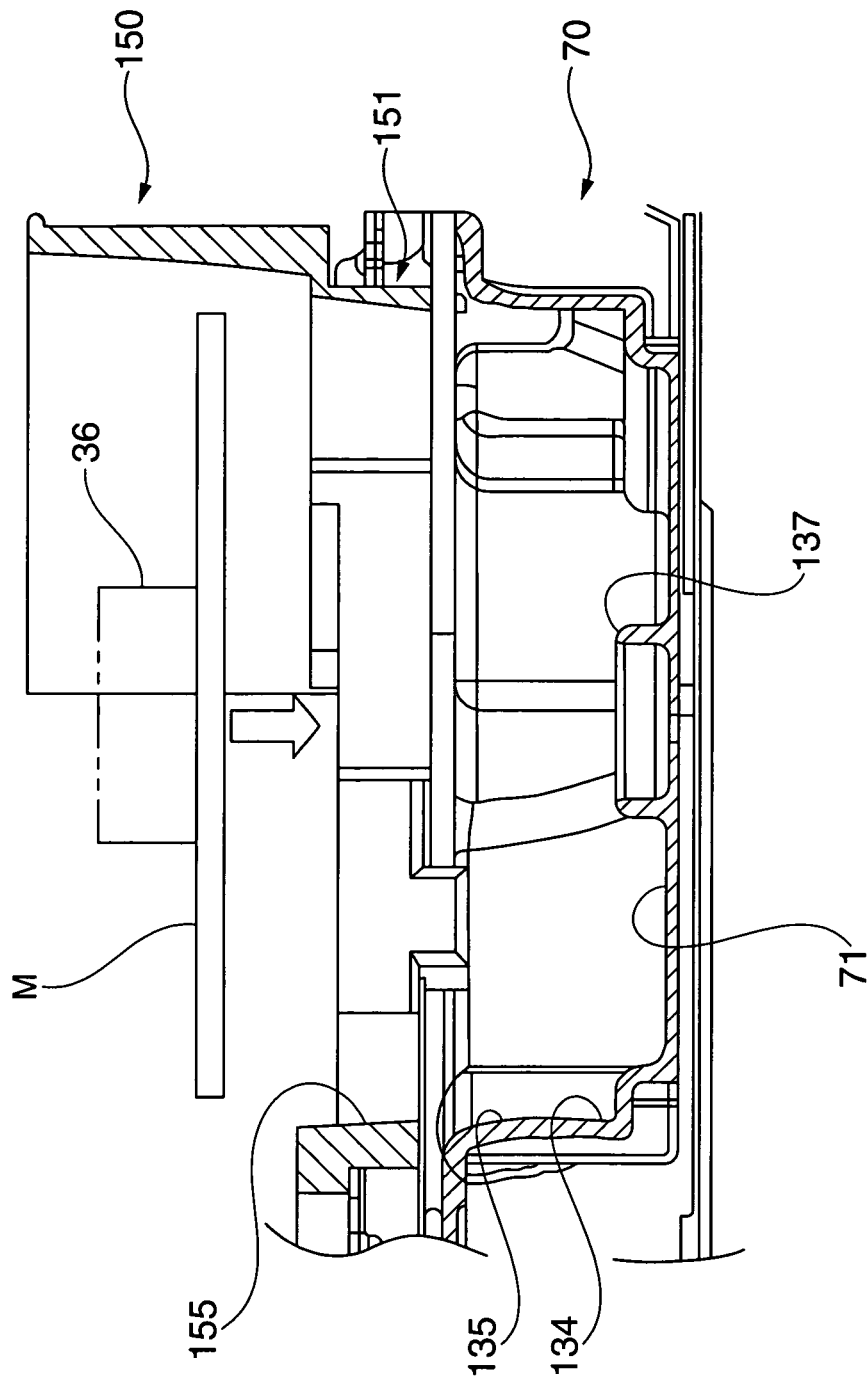
FIG. 20 is a section view showing the stacker unit of the tray and the tubular guide part of the guide member.
Figure 21:
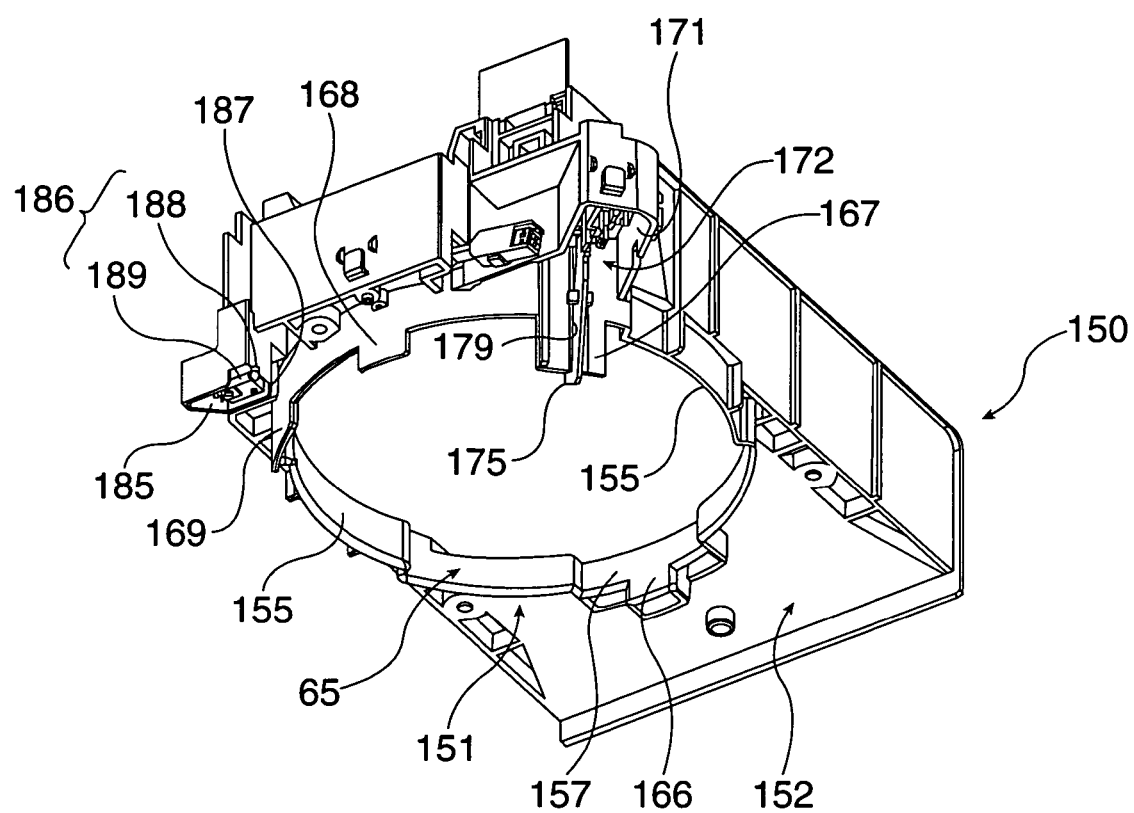
FIG. 21 is an oblique view from the back bottom side of the guide member.
Figure 22:
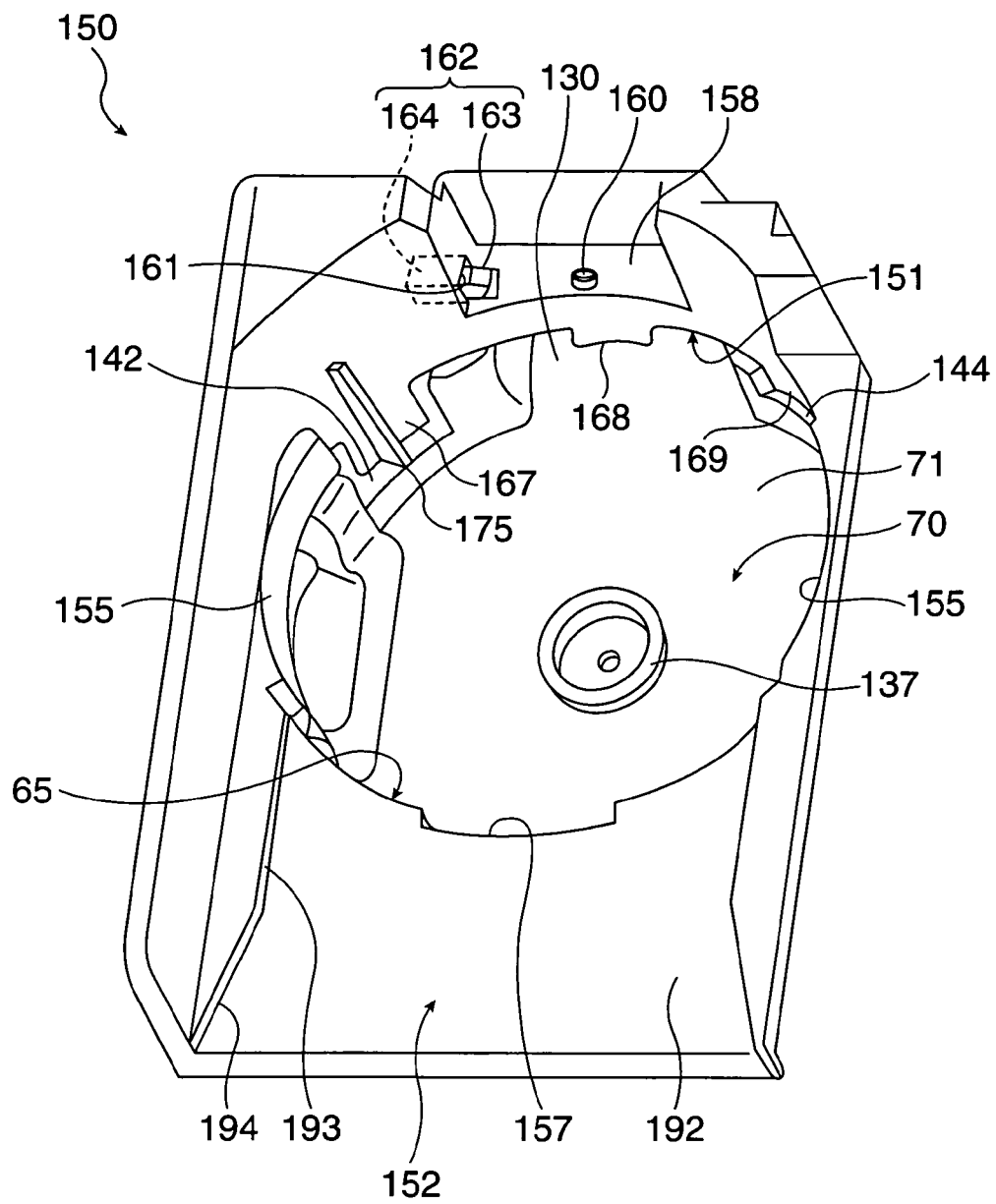
FIG. 22 is an oblique view of the guide member.
Figure 23:
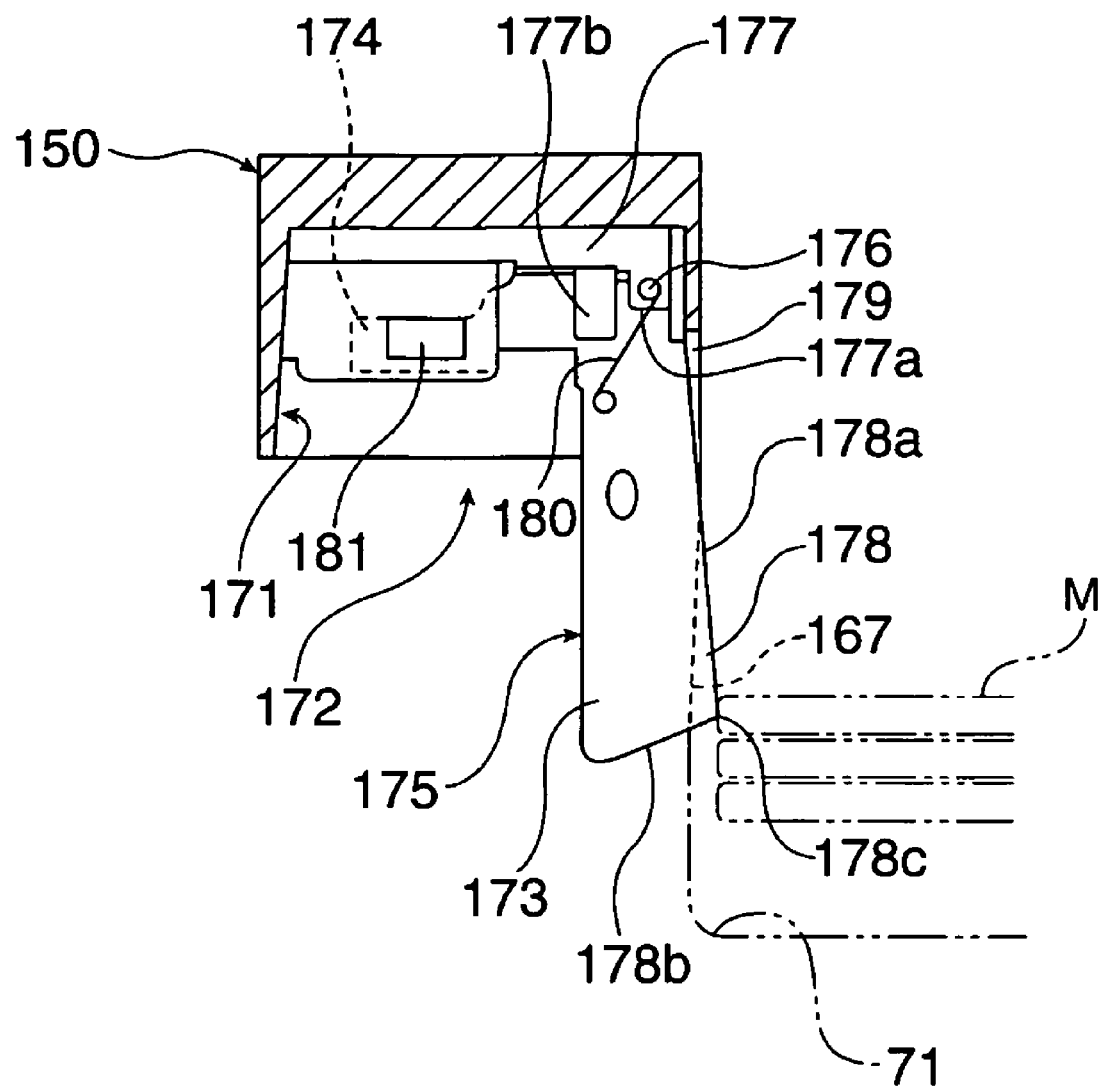
FIG. 23 is a section view showing the installation of the media full detection sensor.
Figure 24:
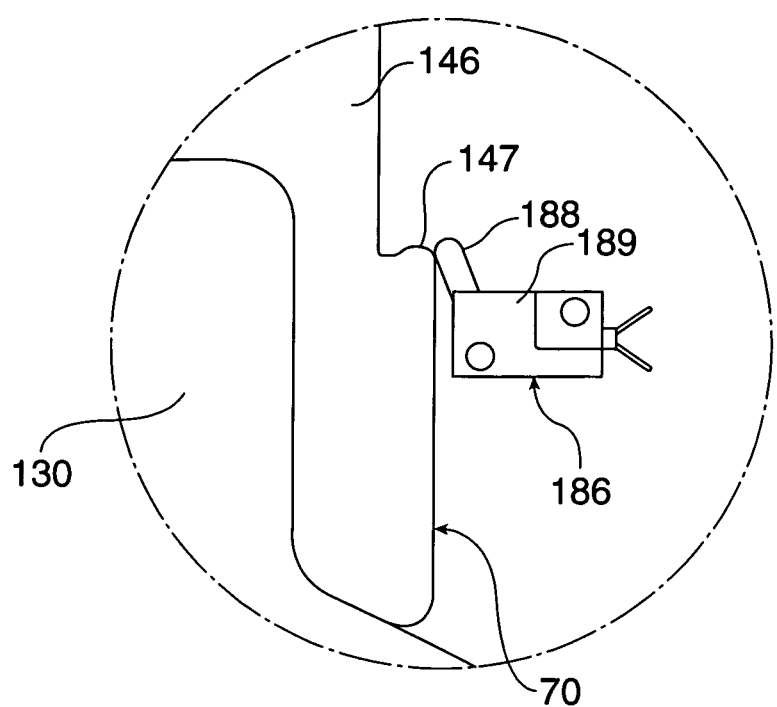
FIG. 24 is an enlarged view showing the operation of the tray storage sensor.
Figure 25:
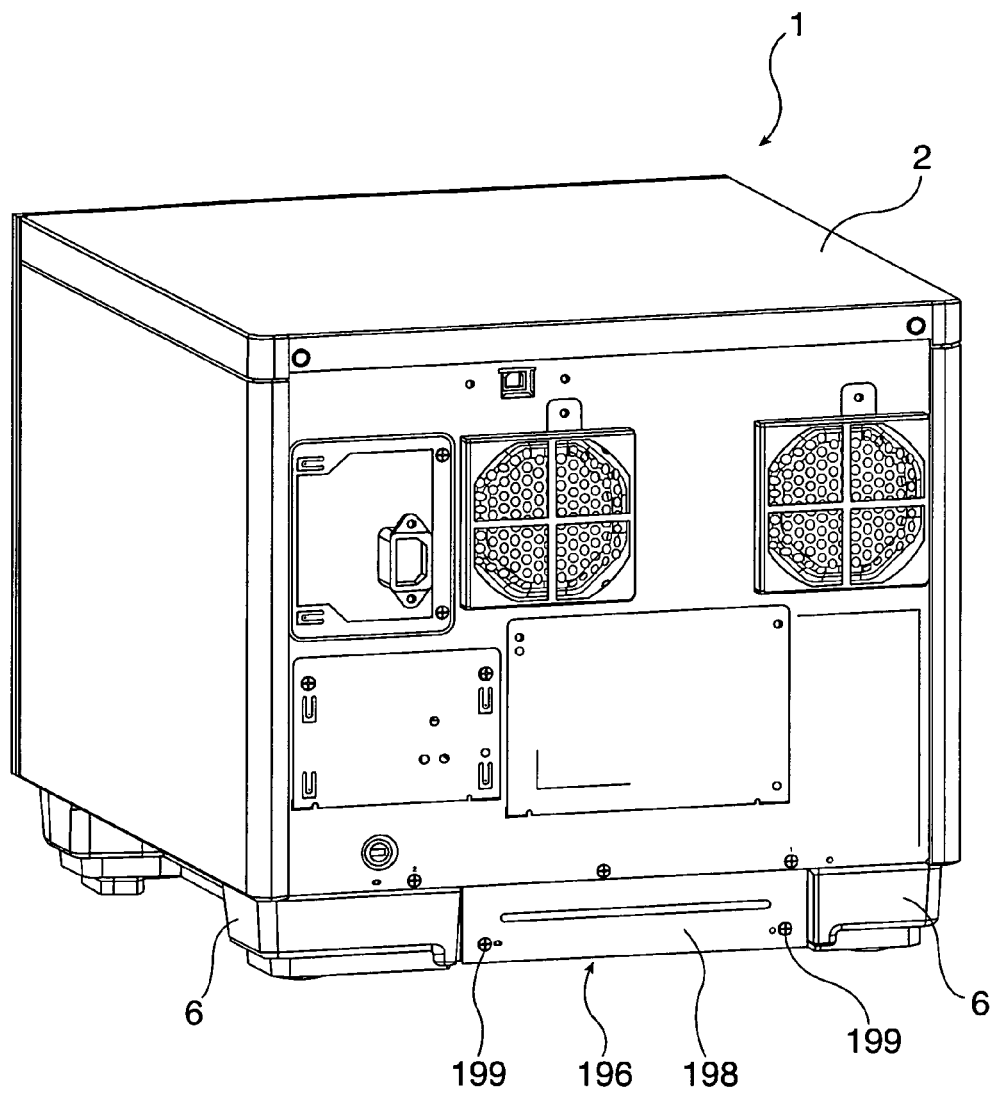
FIG. 25 is an oblique view from the back of the publisher.
Figure 26:
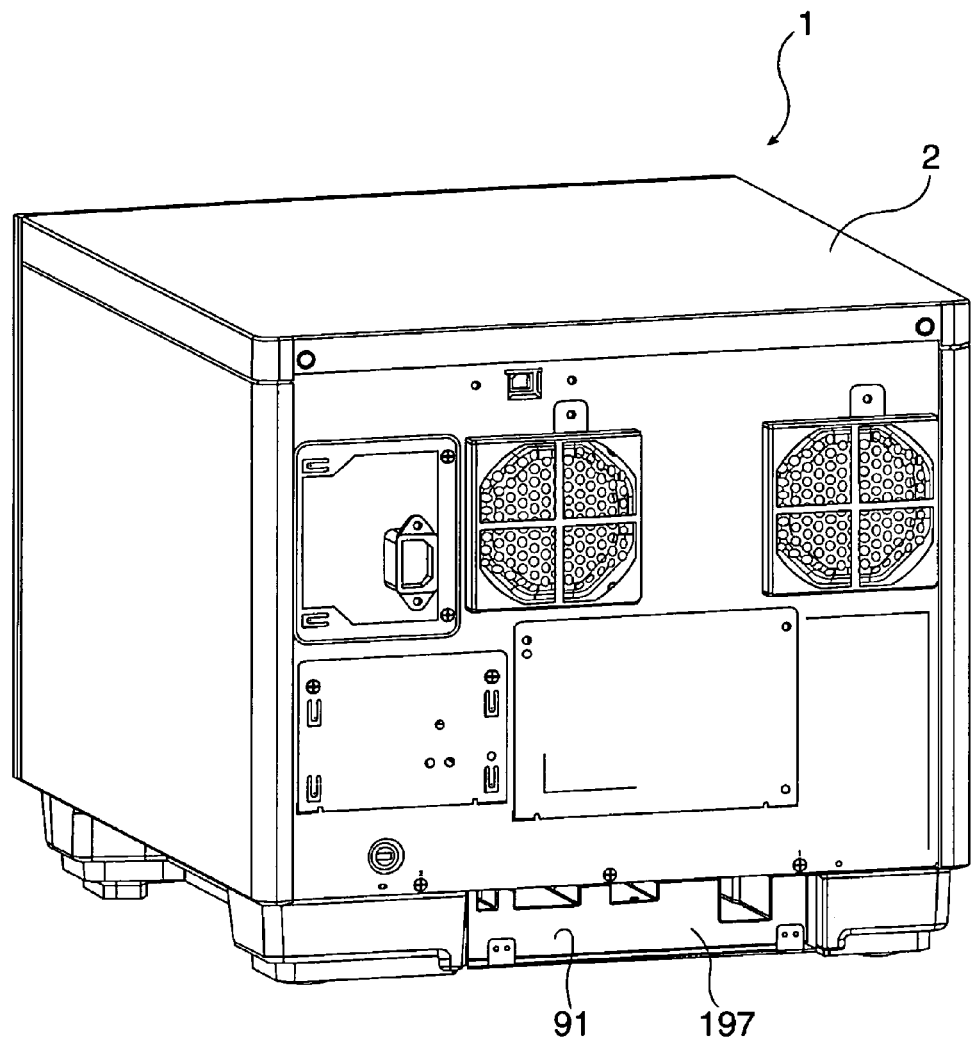
FIG. 26 is an oblique view from the back of the publisher.

FIG. 13 is an oblique view of the main frame. FIG. 14 is an oblique view of the recessed frame and tray. FIG. 15 is a frontal view of the tray holding unit. FIG. 16 and FIG. 17 are oblique views of the tray. FIG. 18 is a plan view showing the tray when stored in the tray holding unit. FIG. 19 is a plan view of the tray when pulled out from the tray holding unit. FIG. 20 is a section view showing the stacker unit of the tray and the cylindrical guide part of the guide member. FIG. 21 is an oblique view from the back bottom side of the guide member. FIG. 22 is an oblique view of the guide member. FIG. 23 is a section view showing the installation of the media full detection sensor. FIG. 24 is an enlarged view showing the operation of the tray storage sensor. FIG. 25 and FIG. 26 are oblique views of the publisher from the back.

As shown in FIG. 13 and FIG. 14, the drawer mechanism 7 includes a sheet metal main frame 30 and a recessed drawer frame 91 that is also made of sheet metal and is fastened to the bottom of the main frame 30.

The drawer frame 91 is a recessed frame composed of a bottom panel 92, a pair of side walls 93 and a pair of attachment rails 94. The side walls 93 rise perpendicularly from the right and left edges of the bottom panel 92. The attachment rails 94 extend in mutually opposite directions from the top edges of the side walls 93. The drawer frame 91 also has a pair of stops 96 (storage limiting parts) that extend in mutually opposite directions from the front ends of the side walls 93. The curved parts of the side walls 93 and stops 96 are bent in an arc, rendering a curved border part 95.

As shown in FIG. 15, the drawer frame 91 is fastened to the main frame 30 with the attachment rails 94 against the bottom of the main frame 30. The main frame 30 and drawer frame 91 thus form a tray holding unit 98 that supports the tray 70 so that the tray 70 can slide in and out.

The tray holding unit 98 and the tray 70 held therein are thus disposed in a location outside of the area used by the access door 3 to open and close above the main frame 30. The stacker unit 71 disposed on the tray 70 is also located below the bottom of the main frame 30. The tray 70 is also protected from scratching and marring when sliding in an out because the transition between the side walls 93 and the stops 96 is the curved border part 95.

A plastic low friction sheet 114 that reduces sliding friction with the bottom of the tray 70 is adhesively attached along both right and left sides of the top of the bottom panel 92 of the drawer frame 91 part of the tray holding unit 98. The low friction sheets 114 extend lengthwise in the direction that the tray 70 slides, and similar low friction sheets 115 that reduce sliding friction with the top of the tray 70 are adhesively attached to the bottom on the right and left sides of the main frame 30 part of the tray holding unit 98.

As shown in FIG. 16, a control channel 100 formed in the sides of the tray 70 is disposed on the pair of side walls 93 of the drawer frame 91, or more particularly on the right and left sides of the tray holding unit 98. As shown in FIG. 14, a flat spring 102 that pushes against the bottom part of the control channel 100 is disposed to the side walls 93. The flat spring 102 includes a spring member 103, a support pin 104, and a roller 105. The spring member 103 is made of spring steel and has a curved portion that extends from the side wall 93 towards the back of the tray 70, and a straight portion that extends from the curved portion toward the front of the tray 70 in the direction that the tray 70 slides out. The support pin 104 is supported vertically at the end of the spring member 103 that is located toward the front of the tray 70, and the roller 105 is supported rotatably on the support pin 104. The flat spring 102 causes the roller 105 to contact the bottom part of the control channel 100 on the side of the tray 70 so that the roller 105 rotates in the direction of the bottom of the control channel 100 when the tray 70 slides, that is, rotates on the support pin 104 as the tray 70 slides.

A pair of pull-out stopping parts 107 protrude from both sides of the tray holding unit 98 formed by the pair of side walls 93 of the drawer frame 91. The pull-out stopping parts 107 contact the pull-out stops 108 of the tray 70 on the inside side of the flat spring 102 when the tray 70 is pulled out and stop the tray 70 from coming completely out.

Bumpers 109 made of rubber or other material for absorbing shock when contacting the pull-out stopping parts 107 are adhesively attached to the front side of the pull-out stops 108. The shock absorbers could be disposed to the back side of the pull-out stopping parts 107 instead, or on both the pull-out stops 108 and the pull-out stopping parts 107. The relative positions of the pull-out stopping parts 107 and the bumpers 109 affixed to the pull-out stops 108 are set so that the inside media access recess 130 for removing media is located outside the publisher 1 when removing media from inside (see FIG. 11 and FIG. 17).

Drawer stops 111 that protrude to the right and left sides as shown in FIG. 17 are formed at the front end of the tray 70. The stops 96 on the ends of the drawer frame 91 (see FIG. 14) contact and stop further movement of the drawer stops 111 when the tray 70 slides in, and thereby stop the tray 70 at the end of travel when sliding into the drawer frame 91.

A bumper 112 made of rubber or other shock absorbing material is adhesively attached to the front of each stop 96 of the drawer frame 91 to absorb the impact when the stops 96 contact the drawer stops 111 of the tray 70. Note that these shock absorbers could be provided on the back side of the drawer stops 111, or on both the drawer stops 111 and the stops 96.

In order to control the sliding resistance of the flat spring 102 according to the position of the tray 70, the depth of the bottom of the control channels 100 in the tray 70 varies along the length of the tray 70. More specifically, a taper 117 (see FIG. 16) is formed on the bottom of the control channel 100 so that the width between the sides of the tray 70 at the front of the tray 70 (the end where the drawer stops 111 are formed) is narrow (the control channel 100 is deep) and gradually increases (the channel becomes shallower) towards the back (the opposite end as the drawer stops 111) of the tray 70.

The taper 117 is the part that the roller 105 contacts when the tray 70 is stored in the tray holding unit 98, and when the tray 70 slides into the tray holding unit 98, the urging force of the flat spring 102 applied through the roller 105 is directed by the taper 117 to the inside end of the tray holding unit 98. As a result, when the tray 70 is stored in the tray holding unit 98, the drawer stops 111 of the tray 70 touch the bumper 112 disposed to the stops 96 of the drawer frame 91 as shown in FIG. 18. More specifically, when the roller 105 contacts the taper 117, the urging force of the flat spring 102 pulls the tray 70 in until the drawer stops 111 meet the bumpers 112 just before the drawer stops 111 contact the bumpers 112, and the tray 70 finally stops at the position where the repulsion force of the bumper 112 and the urging force of the flat spring 102 are balanced (the storage position).

A protruding surface part 118 is formed at a constant shallow depth at the bottom of the control channel 100 on the side of the taper 117 towards the back of the tray 70, and another taper 119, which is formed continuing towards the back of the tray 70 from the protruding surface part 118 increases the depth of the control channel 100. A deep surface part 120 of a constant depth greater than the protruding surface part 118 is formed from the back side of the taper 119, and yet another taper 121 that is formed from the bottom of the deep surface part 120 is sloped to reduce the depth of the channel. Another protruding surface part 122 of a constant depth equal to the protruding surface part 118 is formed from the back side of the taper 121. As a result, protruding surfaces 118 and 122 that are positioned to the outside of the middle deep surface part 120 (so that the width between the sides of the tray 70 is greater and the depth of the control channel 100 is shallower) are disposed at the front and back ends of the tray 70 on the bottom of the control channels 100 in the tray 70.

A holding detent 123 that is deep (so the width between the walls of the tray 70 is narrow) and short in the sliding direction is disposed on the back end side of the inside protruding surface part 122. The holding detent 123 is formed so that the roller 105 fits therein, and the length of the holding detent 123 is set so that the roller 105 is held therein without play. The bumpers 109 and pull-out stops 108 described above are disposed further to the back from the holding detents 123.

When the tray 70 is pulled out from the storage position where the roller 105 contacts the taper 117, the roller 105 rolls up the taper 117 and onto the front protruding surface part 118. When the roller 105 rolls along the protruding surface part 118, the displacement of the spring member 103 by the roller 105 is high and the sliding resistance is therefore high. The roller 105 is then guided by the taper 119 into the deep surface part 120, and rolls along the deep surface part 120. While rolling along the deep surface part 120, the displacement of the spring member 103 is low and the sliding resistance is low. The roller 105 is then guided by the taper 121 onto the back protruding surface part 122 and rolls along the protruding surface part 122. When the roller 105 rolls along the protruding surface part 122, the displacement of the spring member 103 is high and the sliding resistance is momentarily high. The roller 105 then finally enters the holding detent 123, the bumpers 109 meet the pull-out stopping parts 107, and the tray 70 stops at the maximum outside position.

When the tray 70 is pushed in from the outside position, the roller 105 escapes from the holding detent 123 and rides onto the protruding surface part 122 toward the front. Displacement of the spring member 103 is high while the roller 105 rolls across the protruding surface part 122, and the sliding resistance is accordingly high. The roller 105 is then guided by the taper 121 into the deep surface part 120, and then rolls along the deep surface part 120. Displacement of the spring member 103 is low while the roller 105 rolls along the deep surface part 120, and the sliding resistance is accordingly low. The roller 105 is then guided by the taper 119 onto the front protruding surface part 118. Displacement of the spring member 103 while the roller 105 rolls across the protruding surface part 118 is high, and the sliding resistance is accordingly high. The roller 105 then rolls down the taper 117 until the drawer stops 111 meet the bumpers 112 disposed to the stops 96 and the tray 70 is positioned at the inside storage position.

The roller 105 thus increases the sliding resistance of the tray 70 as it rolls onto the protruding surfaces 118 and 122 before the tray 70 reaches the end of travel when sliding out and before reaching the end of travel when sliding in. This produces positive resistance (a positive click) just before the tray reaches the end of travel (the positions where the tray stops) so that the user knows the tray is nearly at the end of travel and does not cause the tray to forcefully collide with the tray holding unit 98.

In this embodiment of the invention the roller 105 rolls in contact with the deep surface part 120, but it is sufficient to provide a positive response such as this click response and the roller 105 does not need to contact the deep surface part 120. In addition, although the roller 105 is disposed to the distal end of the flat spring 102 positioned in the control channel 100 of the tray 70 in the above example, the invention is not so limited. For example, the roller 105 could be urged against the control channel 100 by a compression spring, or pressure could be applied to the control channel 100 by a stationary wear-resistance member such as a POM instead of a rotating roller 105. This embodiment of the invention uses a roller 105 that rolls in order to reduce the load on moving the tray 70.

A guide channel 125 is formed extending in the out-sliding direction along the top of the tray 70. The end of the guide channel 125 at the inside end of the tray 70 is open and increases in width to the inside end, forming an entry opening 126 (see FIGS. 17-19). Two (a plurality of) pins 127 aligned with the guide channel 125 are disposed projecting down from the main frame 30 part of the tray holding unit 98 at separate positions in the out-sliding direction as shown in FIG. 19. When the tray 70 moves in the in-sliding direction, the first of these pins 127 is guided by the entry opening 126 and enters the guide channel 125 at an intermediate position, and just before the tray 70 reaches the storage position, the second pin 127 is guided by the entry opening 126 into the guide channel 125. The tray 70 is thus positioned side to side as a result of these pins 127 fitting into the tray 70 at the storage position.

A stacker unit 71 is formed in the tray 70 as a cylindrical recess. A pair of media access recesses 130 that are contiguous to the stacker unit 71 are formed at opposite sides of the stacker unit 71 in the direction of tray 70 movement, and another pair of media access recesses 131 similar to the media access recesses 130 are formed contiguously to the stacker unit 71 through connecting members 139 formed on the right and left sides of the stacker unit 71. The bottom of the stacker unit 71, the bottoms of the front and back media access recesses 130, and the bottoms of the right and left media access recesses 131 are thus at substantially the same elevation. A wide complementary recess 132 that is slightly higher than the bottom of the media access recess 131 is formed contiguously from the outside of each of the right and left media access recesses 131. These complementary recesses 132 open to the outside of the tray 70.

Media holding units 134 is formed at four locations on the front and back sides in the direction of tray 70 movement to the right and left media access recesses 131. Each media holding unit 134 rises from the bottom to the outside open end of the stacker unit 71, and projects slightly toward the center of the stacker unit 71. These media holding units 134 are rendered in two pairs on diametrically opposite sides of the center of the stacker unit 71. The stacker unit 71 holds the outside edges of the media M by means of these four media holding units 134. The surfaces of the media holding units 134 facing the center of the stacker unit 71 are concentric arcs that are segments of the same circle. The inside diameter of the media holding units 134, which is the diameter of this circle, is set to allow for manufacturing variations in the media M, and enables storing the media M with a clearance of approximately 1 mm around the outside edge of the media M. More particularly, this inside diameter is set to afford the smallest gap needed between the media holding units 134 and the media M to insert and remove the media M.

The top end of each media holding unit 134 of the stacker unit 71 is a tapered guide 135 that slopes to the outside so that the inside diameter of the stacker unit 71 increases to the top outside end as shown in FIG. 20. The surfaces of the tapered guides 135 facing the center of the stacker unit 71 are segments of the same tapered cylinder around the center of the stacker unit 71. The inside diameter of the tapered guides 135, which is the diameter of this tapered cylinder, is equal to the inside diameter of the media holding units 134 at the bottom end of the tapered cylinder that is contiguous to the media holding units 134, and increases in diameter towards the top outside end. When a disc M is released by the transportation arm 36 of the media transportation mechanism 31 and dropped into the stacker unit 71, the tapered guides 135 guide the media M to the center of the stacker unit 71 for storage between the media holding units 134.

A protruding ring 137 (first support unit) is formed in the center of the bottom of the stacker unit 71. The protruding ring 137 supports the bottom center part of the media M in the non-data recording area on the inside diameter side of the data recording area. The media M are supported at the outside edge by the media holding units 134 while this protruding ring 137 supports the bottom. A protruding seat 138 (second support unit) extending a prescribed length toward the center of the stacker unit 71 is formed on the bottom of the stacker unit 71 contiguously to each of the media holding units 134 (see FIG. 18). The seats 138 are formed at four locations at the outside diameter side of the bottom of the media M. The seats 138 that are adjacent in the front-back direction of tray 70 movement are connected by the connecting members 139 disposed extending at the same height in the same front-back direction. The height of the seats 138 is set to slightly less, such as approximately 0.6 mm less, than the height of the protruding ring 137. When slightly warped media M are stored in the stacker unit 71, this height difference enables the protruding ring 137 to support the inside center part of the media outside the data recording area while the four media holding units 134 support the outside edge and the support units do not touch the data recording area. In addition, if the first disc M is released by the transportation arm 36 of the media transportation mechanism 31 and dropped at an angle into the stacker unit 71, only the outside edge of the media M momentarily contacts the connecting member 139, and the media M is then corrected to a horizontal position. After the disc M is stored horizontally, the support units do not touch the data recording area. The media M can thus be stored without damaging the data recording surface.

In this aspect of the invention, approximately ten media M can be stored in the stacker unit 71. To remove the media M from the stacker unit 71, the operator holds the drawer pull 200 (see FIG. 11) disposed at the front of the tray 70 and pulls the tray 70 out from the main frame 30. The operator can then grip and remove the media M by inserting a finger in one of the media access recesses 130 or 131 and the center hole in the media M. Alternatively, the operator can grip the outside edge of the media M from either the front and back media access recesses 130 or the right and left media access recesses 131 to remove the media M.

Three (a plurality of) channels 142, 143, 144 are formed on the top of the tray 70 on the inside end side of the stacker unit 71 extending along the sliding direction and communicating with the stacker unit 71, and lands 145 and 146 that protrude above the channels are formed in line with the sliding direction of the tray 70 between adjacent channels 142 and 143 and adjacent channels 143 and 144. The term "land" as used herein means any projection that can extend into the channels. The top of the tray 70 on the inside end side of the stacker unit 71 thus has a comb-like arrangement of channels and interceding lands. In addition, a shoulder 147 that protrudes like a step into the channel 144 is formed on the stacker unit 71 end of outside side wall of the land 146 where the land 146 meets the channel 144.

In addition to the main frame 30 and drawer frame 91 described above, the tray holding unit 98 also has a guide member 150 (stacker guide part) affixed to the main frame 30. FIG. 21 is an oblique view of this guide member 150 from the back bottom side. As shown in FIG. 21 the guide member 150 has a cylindrical guide part 151 that is substantially cylindrical in shape, and a flat guide part 152 that extends radially to the cylindrical guide part 151. The inside of the cylindrical guide part 151 is the guide hole 65 described above for installing the removable media stacker 72. The guide member 150 is disposed with the cylindrical guide part 151 fit into an insertion hole 153 (see FIG. 10) from the top of the main frame 30.

As shown in FIG. 21, a pair of media guide parts 155 is formed on the right and left sides of the cylindrical guide part 151 protruding slightly towards the center of the cylindrical guide part 151. The two media guide parts 155 of the cylindrical guide part 151 guide the outside edges of the descending media M. The media guide parts 155 are positioned above the tray 70 in the storage position, and more particularly are located directly above the media holding units 134 and tapered guides 135 of the tray 70 to guide the media M into the stacker unit 71. More specifically, when a disc M is carried by the transportation arm 36 to a near position above the top opening to the cylindrical guide part 151 and the disc M is released from the transportation arm 36, the disc M is guided by the media guide parts 155 of the cylindrical guide part 151, drops into the stacker unit 71, and is guided by the tapered guides 135 of the stacker unit 71 and stored in the media holding unit 134.

The curved surfaces of the media guide parts 155 facing the center of the pair of the media guide parts 155 are sections of the same tapered cylinder. The inside diameter of the media guide parts 155, which is the diameter of the tapered cylinder, is set so that the inside diameter ⟩B of the bottom end of the opening is a small diameter substantially equal to the inside diameter ⟩D of the media holding units 134 of the stacker unit 71, and the walls taper out to a larger diameter at the top end of the opening. The inside diameter ⟩C of the top end of the tapered guides 135 of the stacker unit 71 is greater than the inside diameter ⟩ of the bottom end of the opening between the media guide parts 155 of the guide member 150, and is smaller than the inside diameter ⟩A of the top end of the opening between the media guide parts 155. More specifically, ⟩A>⟩C>⟩B H ⟩D.

As shown in FIG. 22, a guide recess 157 (recessed part) is disposed on the cylindrical guide part 151 on the outside end side of the guide hole 65. The guide recess 157 is formed as a recessed arc facing the center of the guide hole 65. An insertion recess 158 is formed as a recess in the top of the guide member 150 recessed from the guide hole 65 to the inside end of the tray 70.

A positioning stud 160 (protrusion) is disposed at the bottom of the insertion recess 158 projecting up to a small tapered tip. A sensor hole 161 is formed from one side wall to the bottom of the insertion recess 158, and the lever 163 of an installation sensor 162 protrudes from this sensor hole 161. The installation sensor 162 detects if a separate media stacker 72 has been installed in the cylindrical guide part 151 and the stacker unit 71 of the tray 70. More specifically, when this media stacker 72 is installed, the media stacker 72 pushes the lever 163 down and the sensor unit 164 can thereby detect that a media stacker 72 was installed.

An insertion key 166 (see FIG. 21) is formed at one location on the bottom end of the cylindrical guide part 151 of the guide member 150 forming the ceiling of the tray holding unit 98. The insertion key 166 is formed contiguously with the bottom of the guide recess 157 on the out-sliding side. This insertion key 166 protrudes down and faces the inside of the guide hole 65 with the same curvature as the guide recess 157. Insertion keys 167, 168, 169 that are contiguous with the cylindrical guide part 151 are also formed at three locations on the inside end side. These insertion keys 167, 168, 169 also protrude down and face the inside of the guide hole 65 with the same curvature as the cylindrical guide part 151. These insertion keys 167, 168, 169 thus render a comb-like arrangement on the inside end side of the cylindrical guide part 151.

The insertion key 166 meshes vertically with the media access recess 130 at the front end of the tray 70 when in the storage position, and with the channel 143 when the tray 70 is pulled out. The insertion key 167 likewise fits vertically into and slides inside the channel 142 of the tray 70 when in the storage position, the insertion key 168 fits vertically into and slides into the media access recess 130 at the front of the tray 70 when in the storage position, and the insertion key 169 fits vertically into and slides inside the channel 144 of the tray 70 when in the storage position. The top of the tray 70 and the opposing ceiling of the tray holding unit 98 thus have a series of matching channels and keys that alternately fit together. The center insertion key 168 on the inside end side fits into the channel 143 when the tray 70 is pulled out.

The inside diameter of the circular arc facing the center of the guide hole 65 of the insertion keys 166 to 169 of the cylindrical guide part 151 is positioned substantially coincident to the inside surface of the stacker unit 71 of the tray 70 in the storage position, and the distal ends of the insertion keys 166 to 169 project down from the top of the tray 70. As a result, if a disc M guided by the cylindrical guide part 151 cannot drop into the stacker unit 71 for some reason, such as because the stacker unit 71 is not aligned with the media storage position because the tray 70 is pulled out, for example, the disc M therefore drops onto the top of the tray 70, and the tray 70 is then moved, the disc M is caught by the insertion keys 166 to 169 and the disc M is thus prevented from sliding in between the top of the tray 70 and the ceiling of the tray holding unit 98.

More specifically, because the insertion keys 166 to 169 of the cylindrical guide part 151 are inserted below the top of the tray 70, a disc M dropped on the top of the tray 70 is caught by the insertion keys 166 to 169 if the tray 70 is moved, and therefore stop inside the cylindrical guide part 151, and will not move further to the outside. If the tray 70 is then moved so that the position of the stacker unit 71 in the tray 70 is corrected, the disc M positioned in the cylindrical guide part 151 is directed by the tapered guides 135 into the center of the stacker unit 71 and thus stored by the media holding units 134.

As shown in FIG. 23, an installation recess 171 is formed with the recess open to the top in the side of the insertion key 167. A media full detection sensor 172 (media sensor) is disposed inside this installation recess 171. The media full detection sensor 172 detects the height of the stack of media M held in the stacker unit 71 of the tray 70 in the storage position. This media full detection sensor 172 protrudes to the inside from the insertion key 167. When the height of the stack of media M held inside the stacker unit 71 reaches the allowed maximum height, the media full detection sensor 172 remains continuously depressed and thereby detects the stack height. Note that because the height differs according to the type of media M, the media full detection sensor 172 can detect if the maximum storage count has been reached for a particular type of media M because the media full detection sensor 172 will be activated at the prescribed stack height if a single type of media M is stored.

The media full detection sensor 172 has an L-shaped lever 175 with an operating leg 173 and an activating leg 174. A pin 176 projecting from both sides of the operating leg 173 is formed where the operating leg 173 and the activating leg 174 join. This pin 176 is supported by a support part 177*a* of a support member 177, which is attached to the ceiling of the installation recess 171 in the guide member 150. This enables the lever 175 to pivot on the pin 176.

A detection part 178 that slopes toward the outside at the distal end is disposed on the operating leg 173 of the lever 175. The detection part 178 protrudes to the inside of the stacker unit 71 from a channel 179 formed in the insertion key 167. The urging force of a spring 180 causes the lever 175 to pivot so that the detection part 178 protrudes a prescribed amount inside the stacker unit 71.

The detection part 178 of the lever 175 is disposed so that the height from the protruding ring 137 and seat 138 of the stacker unit 71 is substantially equal to the allowable height of the media M in the stacker unit 71.

The top end of the detection part 178 is a top incline 178*a* that slopes so that the protrusion into the stacker unit 71 decreases to the top of the detection part 178. The bottom of the detection part 178 is a bottom incline 178*b* that slopes so that the protrusion becomes smaller toward the bottom.

The activating leg 174 of the lever 175 is held on both sides by a guide member 177*b* disposed on the support member 177. An optical sensor unit 181 is disposed to the support member 177 at the side of the activating leg 174. This optical sensor unit 181 turns on when the detection part 178 protrudes maximally into the stacker unit 71. When the lever 175 pivots in the direction causing the detection part 178 to retract from the stacker unit 71, the activating leg 174 turns the sensor unit 181 off (the position shown in FIG. 23). The detection signal from the sensor unit 181 is sent to the control unit.

When the media M are stored in the stacker unit 71, the media M contact the top incline 178*a* of the lever 175 of the media full detection sensor 172, thus pushing the top incline 178*a* in the retraction direction and causing the lever 175 to pivot on the pin 176 supported by the support member 177. This displaces the distal end of the activating leg 174 upward so that the activating leg 174 switches the sensor unit 181 from on to off. When the disc M descends past the end of the top incline 178*a*, the force of the spring 180 causes the lever 175 to pivot out again, thus displacing the distal end of the activating leg 174 down so that the activating leg 174 switches the sensor unit 181 from off to on again. If the time between when the sensor unit 181 switches from on to off and then switches on again is within a predetermined limit, the control unit knows that the disc M passed the media full detection sensor 172 and determines that the stack height is less than the maximum allowable height.

When the number of media M in the stacker unit 71 increases so that the stack reaches the maximum height, the outside edge of the disc M on the top of the stack stops against the distal end 178*c*, which is the transition point between the top incline 178*a* and the bottom incline 178*b* of the lever 175 of the media full detection sensor 172 (see FIG. 23). The sensor unit 181 therefore switches from on to off and then remains off instead of switching on again. The control unit determines that the stack of media M has reached the maximum allowable height if the sensor unit 181 does not turn on again within a prescribed time after the sensor unit 181 switches from on to off.

Because the slope of the top incline 178*a* of the detection part 178 is gradual, the detection part 178 does not interfere when the media M enter the stacker unit 71, and the media M thus enter the stacker unit 71 smoothly.

In addition, if the bottom incline 178b of the detection part 178 stops against the media M in the stacker unit 71, friction therebetween could lock and prevent the lever 175 from pivoting. In this case the lever 175 cannot pivot for the next disc M to be stored. To prevent the lever 175 from thus locking, the angle between the bottom incline 178b of the detection part 178 to the media M is set as large as possible.

By providing a media full detection sensor 172, the control unit can interrupt conveying media M to the stacker unit 71 when based on the detection signal from the media full detection sensor 172 the control unit determines that the stacker unit 71 has been filled to capacity and already holds the maximum number of discs when the media transportation mechanism 31 is delivering media M to the stacker unit 71.

When the user then removes the media M from the stacker unit 71, the control unit can determine based on the detection signal from the media full detection sensor 172 that media M can be delivered to the stacker unit 71, and therefore resumes feeding media M to the stacker unit 71 by means of the media transportation mechanism 31.

Note that the media M can be easily removed from the stacker unit 71 by pivoting the lever 175 of the media full detection sensor 172.

An installation recess 185 (see FIG. 21) is formed recessed on the outside of the insertion key 169, which is on either the right or left side of, and on the inside end side of, the guide member 150. A tray storage sensor 186, such as a leaf switch that detects whether or not the tray 70 is in the storage position, is disposed inside the installation recess 185. The tray storage sensor 186 includes a rocking lever 188 and a sensor unit 189 that detects rocking of the lever 188. The lever 188 protrudes into the range of movement of the shoulder 147 of the tray 70 from a notch 187 in the installation recess 185.

When the tray 70 is pulled out, the tray storage sensor 186 rocks in one direction as a result of the lever 188 separating from the shoulder 147 of the tray 70. When the lever 188 rocks in this direction, the switch of the sensor unit 189 turns from on to off, and the tray 70 is detected to be removed from the tray holding unit 98 to the pulled-out position. When the tray 70 is pulled all the way out, the tray 70 is exposed from the front end to the media access recess 130 on the back side of the stacker unit 71.

When the tray 70 is in the media storage position in the tray holding unit 98, the lever 188 is pushed by the shoulder 147 of the tray 70 and rocks in the opposite direction as shown in FIG. 24. When the lever 188 thus rocks in this opposite direction, the switch of the sensor unit 189 goes from off to on, and the tray storage sensor 186 detects that the tray 70 is in the storage position. At the moment the tray storage sensor 186 detects that the tray 70 is housed in the tray holding unit 98 (when the switch goes from off to on), the roller 105 of the flat spring 102 contacts the taper 117 and the force of the flat spring 102 works in the direction urging the tray 70 inside to the storage position. As a result, the tray 70 detected by the tray storage sensor 186 is positioned reliably in the storage position.

By providing a tray storage sensor 186 as described above, the control unit can interrupt the delivery of media M to the stacker unit 71 if, when the media transportation mechanism 31 is carrying media M to the stacker unit 71, the control unit determines based on the detection signal from the tray storage sensor 186 that the tray 70 was pulled out from the tray holding unit 98 to the media removal position.

When the tray 70 is stored in the tray holding unit 98 by the user, the control unit determines based on the detection signal from the tray storage sensor 186 that media M can be delivered to the stacker unit 71 of the tray 70, and thus resumes carrying media M to the stacker unit 71 by means of the media transportation mechanism 31.

A sliding guide channel 192 (see FIG. 22) that guides the media stacker 72 as it slides is formed on the top of the flat guide part 152 of the guide member 150. The walls of this sliding guide channel 192 on the guide hole 65 side of a prescribed middle position are a pair of mutually parallel straight walls 193, and on the open area 8 side of the case 2 from the prescribed middle position are a pair of symmetrically tapered walls 194 that move mutually apart with proximity to the open area 8.

When the tray 70 is pulled out, the back end of the tray 70 is positioned on the outside side of the guide hole 65, and foreign objects could therefore enter the space behind the tray 70 from the gap between the back end of the tray 70 and the guide hole 65. If foreign objects get into this space and the tray 70 is pushed in, the foreign object could become trapped between the tray 70 and the back side of the case 2, and it may not be possible to set the tray 70 to the storage position. As a result, as shown in FIG. 25, an openable unit 196 is disposed at the back of the case 2 so that the space between the tray 70 and the back of the case 2 can be opened and exposed to the outside. As shown in FIG. 26, the openable unit 196 includes an opening 197 formed in the back of the case 2, and a cover member 198 that is removably attached to the back of the case 2 so that the opening 197 can be closed. In this aspect of the invention the removable cover member 198 is fastened by screws 199 to the back of the case 2.

The cover member could alternatively be attached by a hinge mechanism to open and close to the back of the case 2, or the cover member could be a flexible member that can be flexed and fit into the opening 197 in the case 2.

The removable media stacker 72 is described next.

Figure 27:
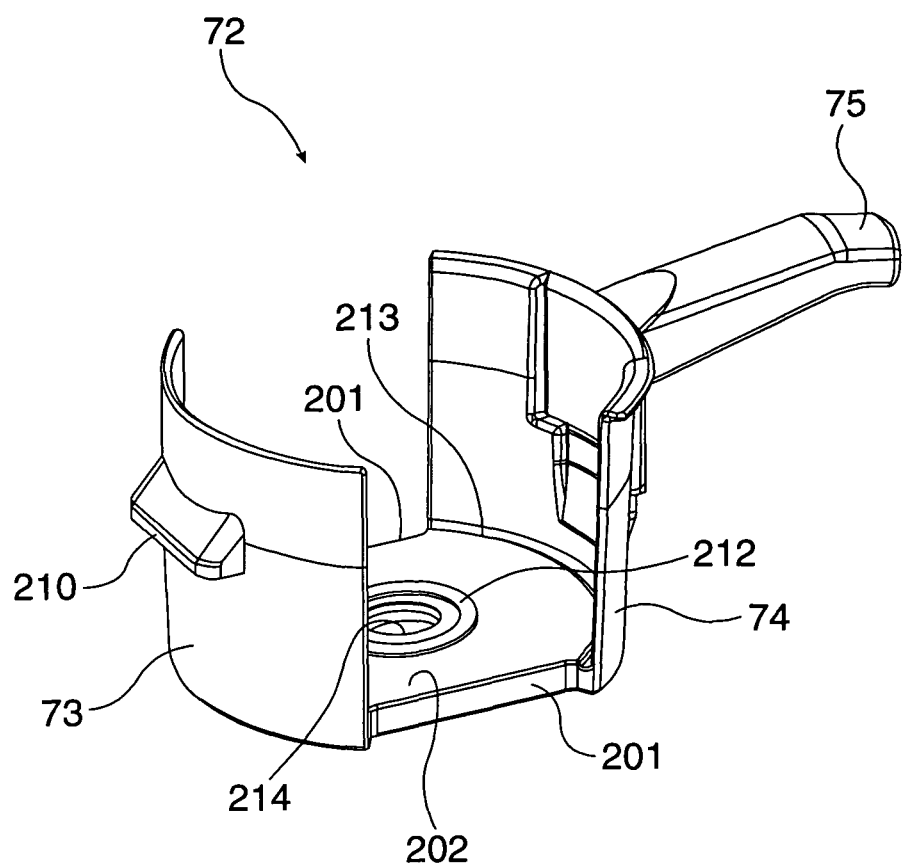
FIG. 27 is an oblique view of the media stacker.
Figure 28:
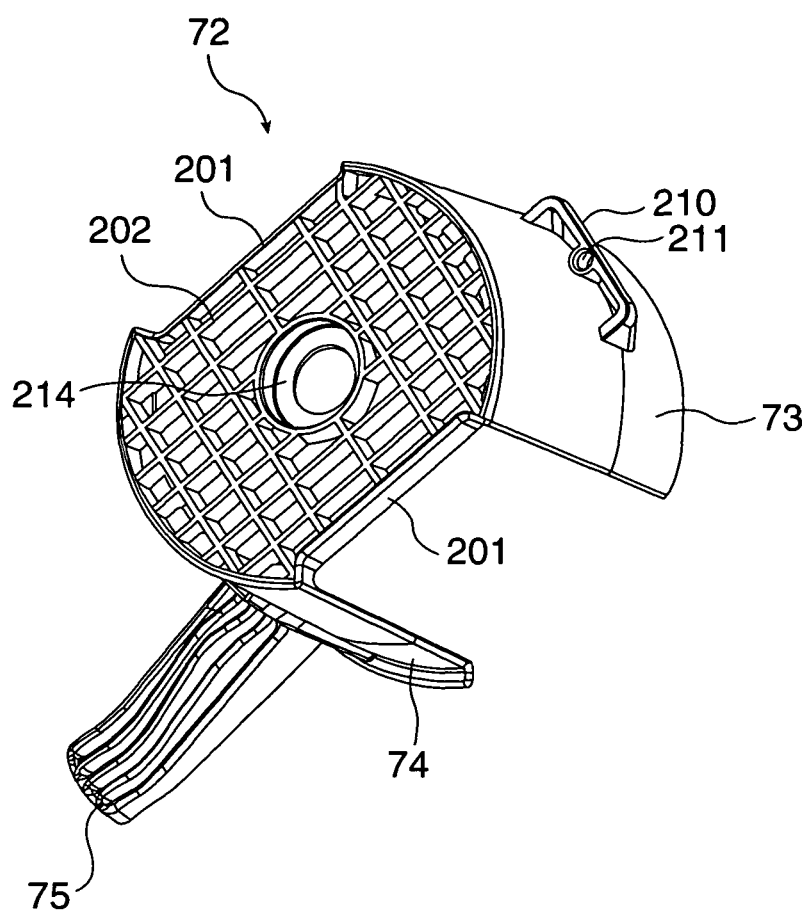
FIG. 28 is an oblique view of the media stacker.
Figure 29:
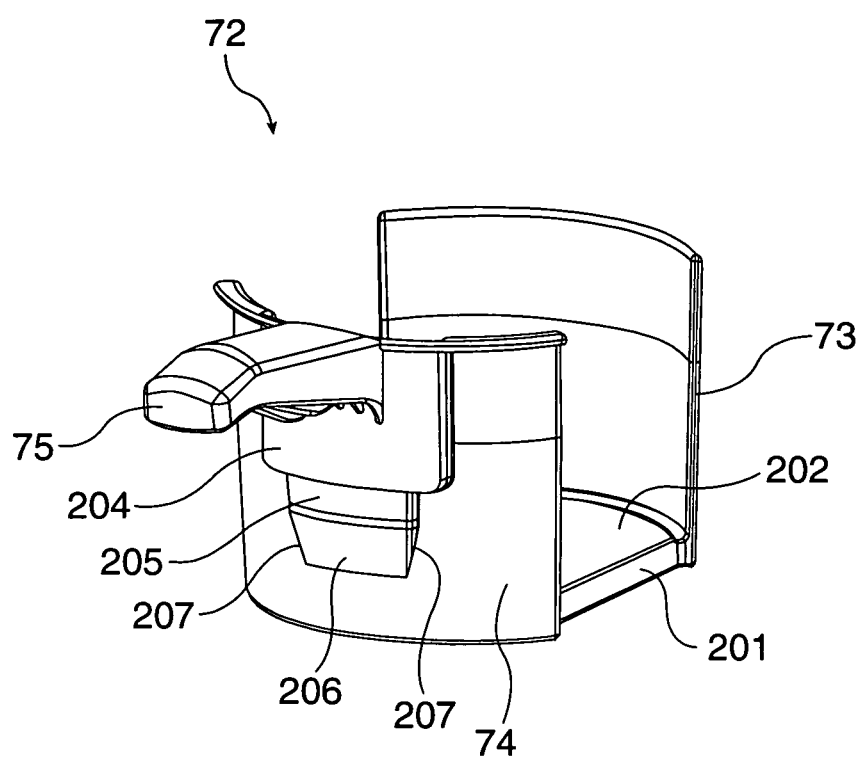
FIG. 29 is an oblique view of the media stacker.

FIG. 27, FIG. 28, and FIG. 29 are oblique views of the media stacker 72, and FIG. 30 is a section view of the media stacker.

The media stacker 72 is a monolithic molding made of plastic, and as shown in FIG. 27 and FIG. 28, has a basically disc-shaped bottom 202 with parallel side notches 201 at two places on the outside edge of the disc, and side walls 73 and 74 that are sections of a cylinder and rise from the round parts of the bottom 202.

A handle 75 is formed projecting to the outside from the middle of the one side wall 74 at the opposite end from the bottom 202. As shown in FIG. 29, a base unit 204 that projects from the opposite side of the side wall 74 as the other side wall 73 is formed at the base end of the handle 75. An engagement key 205 (protrusion) that projects from the opposite side of the side wall 74 as the other side wall 73 and is narrower than the base unit 204 is formed on the bottom 202 side of the base unit 204. The engagement key 205 fits into the guide recess 157 in the guide member 150 shown in FIG. 22, and the width between the right and left sides is slightly less than the width of the guide recess 157. A tapered surface 206 that tapers from the engagement key 205 down to the side wall 74 is formed from the bottom of the engagement key 205. A pair of tapered surfaces 207 are formed from the bottom of the engagement key 205 so that the width between the tapered surfaces 207 narrows with proximity to the bottom. The tapered surface 206 and tapered surfaces 207 facilitate fitting the engagement key 205 into the guide recess 157.

A lip 210 that protrudes in the opposite direction as the one side wall 74 is formed at the outside middle part of the other side wall 73. This lip 210 is inserted to the insertion recess 158 (see FIG. 22). A positioning recess 211 that fits onto the pointed positioning stud 160 of the insertion recess 158 is formed on the bottom of the lip 210.

As shown in FIG. 30, an annular support unit 212 is formed rising slightly from the bottom 202 of the media stacker 72, and curved channels 213 are formed recessed along the outside edge of the bottom. A stepped escape hole 214 is formed in the middle of the bottom 202.

When the media stacker 72 is placed in the guide member 150, the user holds the handle 75, slides the media stacker 72 along the sliding guide channel 192 to the inside, and inserts the bottom 202 and the side walls 73 and 74 into the guide hole 65. With the handle 75 positioned to the front as seen from the open area 8, the inside lip 210 is inserted into the insertion recess 158 further to the inside from the guide hole 65, and fits the positioning stud 160 of the insertion recess 158 into the positioning recess 211 of the lip 210. The front engagement key 205 is also fit into the guide recess 157 in front of the guide hole 65, and the base unit 204 is placed on the bottom of the sliding guide channel 192. By thus fitting the positioning stud 160 in the inside positioning recess 211, the media stacker 72 is positioned in the side to side direction and the front to back direction in this part of the guide member 150, and by fitting the engagement key 205 in front of the guide hole 65 to the guide recess 157 is positioned side to side to this part of the guide member 150. The media stacker 72 is thus positioned on the guide member 150.

The media stacker 72 is thus installed in the stacker unit 71 of the tray 70 and the cylindrical guide part 151 of the guide member 150. The relationship between the different parts when the media stacker 72 as thus installed is described next.

The engagement key 205 and guide recess 157 fit together with clearance therebetween in the front-back direction.

The bottom of the media stacker 72 fits inside the stacker unit 71, and the protruding ring 137 of the stacker unit 71 fits inside the escape hole 214. The bottom 202 of the media stacker 72 is positioned between the connecting members 139 at substantially the same height with the side notches 201 located near the inside of the connecting members 139 of the stacker unit 71 of the tray 70 (see FIG. 13). The media holding unit 134 and the tapered guide 135 of the stacker unit 71 and the media guide parts 155 of the guide member 150 directly above the media holding unit 134 and tapered guide 135 are positioned in the space between the side walls 73 and 74. When the lever 163 of the installation sensor 162 is pushed by the bottom of the lip 210 and rocks (see FIG. 22), the signal output from the installation sensor 162 due to this rocking enables the control unit to detect that the media stacker 72 was set correctly in the cylindrical guide part 151 and stacker unit 71 of the tray 70.

By positioning the tapered guide 135 and tapered guide 135 of the stacker unit 71, and the media guide parts 155 of the guide member 150 between the side walls 73 and 74, media M deposited into the media stacker 72 and the prescribed number below are guided and held by these guide member (see FIG. 13). More specifically, the media M deposited in the media stacker 72 are guided by the media guide parts 155 and tapered guide 135 and held by the media holding unit 134 in the same way as when the media M are stored in the stacker unit 71. In addition, when the installation sensor 162 detects that the media stacker 72 was correctly installed, the control unit enables storing media M in the media stacker 72.

Figure 7:
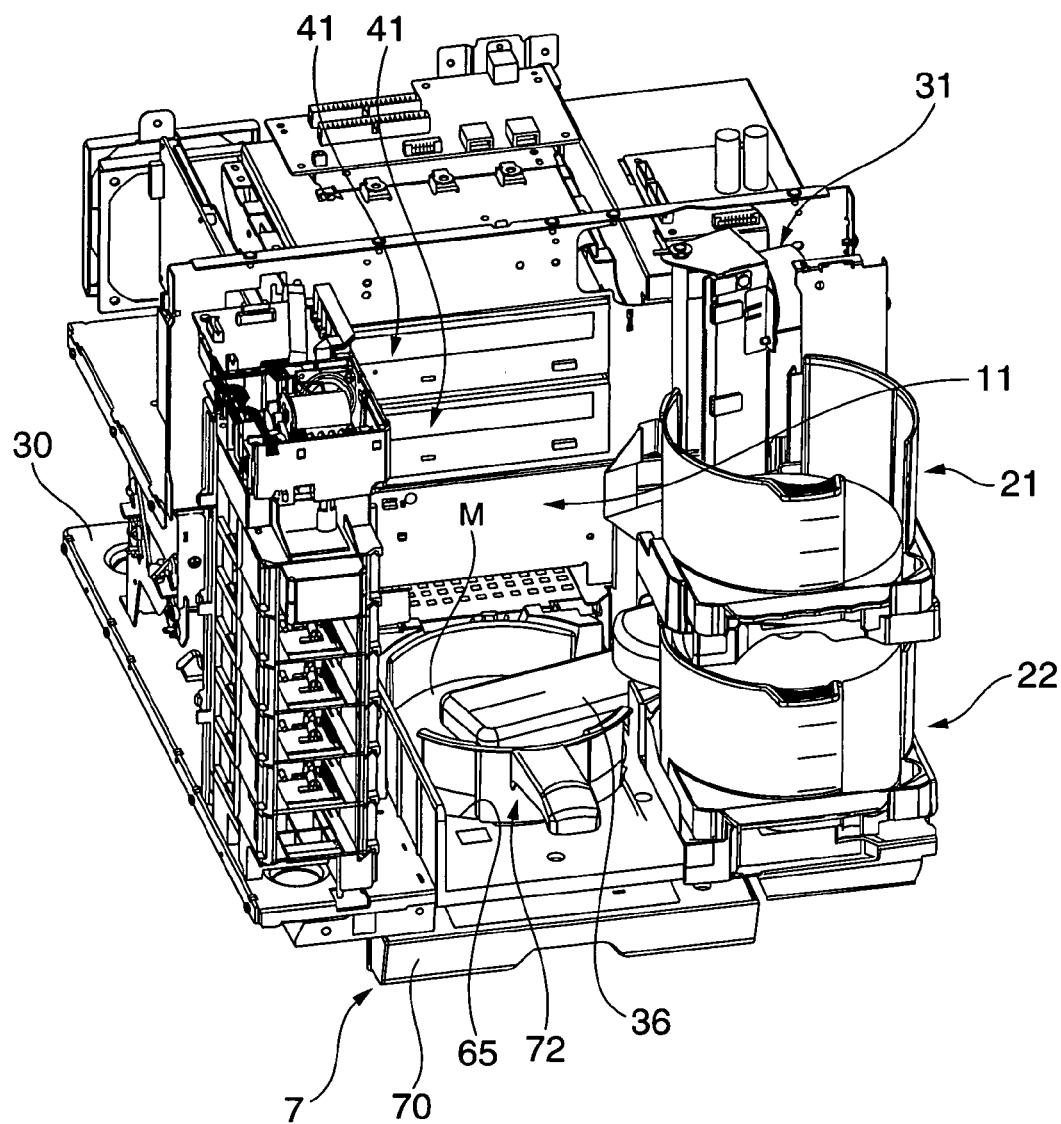
FIG. 7 is an oblique view from the front top of the publisher with the case removed.

When the media stacker 72 is thus installed, its bottom part is positioned below the bottom of the main frame 30 as a result of being inserted to the stacker unit 71 of the tray 70 (see FIG. 7). The front-back clearance between the engagement key 205 of the media stacker 72 and the guide recess 157 of the guide member 150 is set to prevent the engagement key 205 from being pressed against the guide recess 157 and creating sliding resistance even if the one side wall 74 bends toward the bottom 202 when the user holds the handle 75 and lifts the media stacker 72 containing the maximum number of storable media M.

Note that when the media stacker 72 is installed, the lever 175 of the media full detection sensor 172 is pushed out in the retraction direction by the media stacker 72, and the sensor unit 181 switches from on to off and then remains off. The control unit can therefore detect from the signal from the sensor unit 181 that the media stacker 72 was installed.

As described above, the top of the tray 70 and the ceiling part of the tray holding unit 98 include corresponding channels and lands in a media processing device composed of the publisher 1 according to this embodiment of the invention. For example, if a disc M is released from the transportation arm 36 of the media transportation mechanism 31 when the tray 70 has been pulled out, the disc M will drop onto the top of the tray 70. As a result, a disc M that could not be stored in the stacker unit 71 will not become stuck between the tray 70 and the tray holding unit 98 when the tray 70 moves. The disc M can therefore be discharged without being damaged.

Furthermore, because the insertion keys 166, 167, 168, and 169 on the guide member 150 rendering the ceiling of the tray holding unit 98 are positioned to fit into the channels 142, 143, 144 disposed in the top of the tray 70 along the direction of tray 70 travel, if a disc M is dropped onto the top of the tray 70 instead of being stored in the stacker unit 71, the insertion keys 166, 167, 168, and 169 will catch the disc M when the tray 70 moves. The disc M will therefore move together with the tray 70, and is prevented from becoming jammed between the ceiling part of the tray holding unit 98 and the tray 70.

As also described above, an insertion key 166 is disposed in front and the insertion keys 167, 168, 169 are disposed in back of the stacker unit 71 of the tray 70 stored in the tray holding unit 98 in the tray removal direction. As a result, even if a disc M is on top of the tray 70, moving the tray 70 to the storage position causes the stacker unit 71 of the tray 70 to approach the disc M caught by the insertion keys 167, 168, 169, and the disc M is guided by the tapered guides 135 into the stacker unit 71.

The tray 70 held in the tray holding unit 98 is moved to the storage position and media M are stored inside the publisher 1 in the stacker unit 71. When the tray 70 is pulled out, the media M can be removed without opening the access door 3 because the tray 70 is located outside the area occupied by the access door 3 when the access door 3 opens and closes. Therefore, if a software application, for example, sets the destination of the media M to the stacker unit 71 of the tray 70, the finished media M can be sequentially removed as the discs are completed without stopping processing by opening the access door 3.

Furthermore, because the media M can be removed without opening the access door 3, media M being processed will not be accidentally touched when removing the media M, and removing the media M has no effect on the reliability of media M processing.

In addition, because the stacker unit 71 is inside the publisher 1 when the stacker unit 71 receives media M, the media M do not need to slide down an inclined surface and can be discharged without damaging the media M. In addition, because the stacker unit 71 is inside the publisher 1 when the stacker unit 71 receives media M, the installation space that is required and the resulting space limitations imposed by using an external stacker are eliminated, and the publisher 1 can be placed with greater freedom.

Yet further, because the media M guided by the tapered guides 135 on top of the stacker unit 71 and stored between the media holding units 134 can be held with no little clearance, the media M will not slide against each other inside the media holding unit 134 when the tray 70 is pulled out. The surfaces where the media touch each other will therefore not be damaged.

Furthermore, because the center of the disc M on the bottom of the stack is supported by a protruding ring 137 disposed in the center of the bottom of the stacker unit 71, the data recording area on the bottom side of the bottom disc M is not touched and the quality of the data recording area can be maintained.

Yet further, as shown in FIG. 17, a seat 138 that is a second support unit protruding slightly below the bottom disc M is disposed at a position corresponding to the outside edge of the media M. As a result, if a disc M enters the stacker unit 71 at an angle, the bottom of the outside edge of the disc M first momentarily contacts the seat 138 that is the second support unit before the disc M drops into a horizontal position. In addition, because the media M are supported by the protruding ring 137 located in the center outside of the data recording area, even warped media M can be stored without touching the seats 138 touching the data recording area. Furthermore, if the recessed height of the center part supporting the media M is a prescribed height, the media M can be easily gripped and therefore easily removed.

As also described above, the media M are guided from the large diameter top end to the small diameter bottom end of the media guide parts 155, then discharged from the small diameter bottom end of the media guide parts 155 into the top of the large diameter stacker unit 71, and then guided by the small diameter media holding units 134 of the stacker unit 71. As a result, even if the position of the stacker unit 71 of the tray 70 is slightly out of alignment with the media guide parts 155, the media M can be correctly stored between the media holding units 134.

In addition, by locating the center of the media guide parts 155 on the path along which the transportation arm 36 pivots, the media M can be deposited even more reliably in the desired storage position by setting the media release position of the transportation arm 36 to the center of the media guide parts 155.

The media M stored in the stacker unit 71 can also be easily held at the edges and removed without touching the top or bottom surfaces of the media M by inserting fingers into the media access recesses 130 and 131 disposed to the outside edge of the stacker unit 71.

The rigidity of the tray holding unit 98 can also be assured because the tray holding unit 98 is formed by a closed structure when seen in section by fastening the sheet metal drawer frame 91 to the bottom of the sheet metal main frame 30.

Yet further, because the flat spring 102 disposed on the side of the tray holding unit 98 contacts the control channel 100 in the side of the tray 70 and thus pushes against the tray 70, the tray 70 can move without play inside the tray holding unit 98.

In addition, because a roller 105 that rotates in the sliding direction of the tray 70 is disposed on the flat spring 102 where the flat spring 102 contacts the tray 70, the sliding resistance of the flat spring 102 can be reduced without using lubrication. The tray 70 therefore does not become more difficult to slide due to a loss of lubrication, and the user's hand will also not be soiled by oil.

Furthermore, because the taper 117 disposed on the side towards the front of the tray 70 directs the force of the flat spring 102 applied thereto through the roller 105 to the back of the tray 70 in the storage direction, the tray 70 can be urged to the inside of the storage position. The tray 70 can therefore be reliably held in the storage position by the force of the flat spring 102. This also prevents the tray 70 from stopping short of the storage position when it is pushed in lightly, and the tray storage sensor 186 therefore does not detect that the tray 70 is not in the storage position. If the tray 70 is closed forcefully, it will also not rebound and can be held in the storage position. The positions of the media guide parts 155 and the media holding units 134 guided by the tapered guides 135 at the top of the stacker unit 71 can also be consistently aligned.

In addition, because the holding detent 123 positioned on the side at the back end of the tray 70 holds the roller 105 disposed on the flat spring 102, the positive feedback (a positive click) of the roller 105 and the holding detent 123 tells the user if the tray 70 is pulled out.

The protruding surface parts 118 and 122 disposed before and after the center in the direction of tray 70 movement increase the sliding resistance of the flat spring 102. The user can thus sense from the increased sliding resistance of the flat spring 102 that the tray has moved to near the inside end or the front end. If the tray is opened or closed forcefully, the increased sliding resistance effectively brakes movement and softens the impact.

When the tray 70 is closed, bumpers 112 intercede between the drawer stops 111 of the tray 70 and the stops 96 on the tray holding unit 98. The force of impact when the tray 70 is closed is therefore reduced, and the effect of such impact on the media M being processed can be reduced. The quality of media M processing can therefore be kept high even if the tray 70 is operated without stopping processing the media.

When the tray 70 is pulled out, bumpers 109 intercede between the pull-out stops 108 of the tray 70 and the pull-out stopping parts 107 of the tray holding unit 98. The force of impact when the tray 70 is pulled out is therefore reduced, and the effect of such impact on the media M being processed can be reduced. The quality of media M processing can therefore be kept high even if the tray 70 is operated without stopping processing of the media.

Furthermore, because a plurality of pins 127 disposed in the tray holding unit 98 slide along the guide channel 125 when the tray 70 moves, the tray 70 can be moved in a stable posture. In addition, because the plural pins 127 are fit into the guide channel 125 when the tray 70 is in the storage position, the tray 70 can be positioned side to side to the tray holding unit 98 by the pins.

Furthermore, because the low friction sheets 114 and 115 disposed on the tray holding unit 98 reduce sliding friction with the tray 70, the sliding resistance of the tray 70 can also be reduced.

Because a tray storage sensor 186 detects if the tray 70 is in the storage position, media M handling can be changed based on whether or not the tray 70 is in the storage position.

Storing media M above the maximum allowable height in the stacker unit 71 of the tray 70 can also be prevented because the media full detection sensor 172 can detect the height of the media M stored in the stacker unit 71. Media M stacked above the top of the stacker unit 71 will therefore not interfere with pulling the tray 70 out, and media M stacked above the top of the stacker unit 71 will not be damaged when the tray 70 is pulled out. Whether the stacker unit 71 is installed in the media stacker 72 can also be detected by the media full detection sensor 172.

If a foreign object gets into the space behind the tray 70, the openable unit 196 can be opened to easily remove the foreign object. If the tray 70 cannot be closed because of obstruction by a foreign object, the problem can therefore be easily corrected.

The invention is not limited to the foregoing embodiment and can be varied in many ways without departing from the scope of the accompanying claims. For example, a protruding ring 137 is described by way of example as the first support unit, but a plurality of protruding lands for supporting the media M can be provided instead outside of the data recording area in the center of the media M.

The media handled by the invention are not limited to disc-shaped media such as the media M described above, and the invention can also be used with rectangular or other polygonally shaped media as well as oval media. The media are also not limited to any particular optical, magneto-optical, or other type of recording method.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

The invention claimed is:

1. A media processing device, comprising:
a chassis;
a tray having a stacker for storing media; and
a tray holding unit that holds the tray movably between a pulled-out position and a storage position;
wherein a land part is formed on a first surface of at least one of the tray and the tray holding unit, and a channel part is formed on at least part of an opposing surface of the first surface; and
a media guide part that guides the media to the stacker and is disposed on the chassis;
an inside diameter of the media guide part on an opposite end as the stacker is greater than an inside diameter of the media guide part at the stacker end,
an inside diameter of an end of the stacker open to the media holding part is greater than an inside diameter of an end of the stacker at the media guide part, and
an inside diameter of the stacker on a bottom side of the media holding part is substantially equal to the inside diameter of a stacker side end of the media guide part.

2. The media processing device described in claim 1, wherein the land part includes a plurality of land parts and the channel part includes a plurality of channel parts.

3. The media processing device described in claim 2, wherein:
channels are formed as said channel parts along a direction of tray movement on a surface of the tray facing the tray holding unit; and
a protruding part that fits into said channel is disposed on a corresponding surface of the tray holding unit facing the surface of the tray facing the tray holding unit.

4. The media processing device described in claim 3, wherein:
the protruding part disposed on the tray holding unit is disposed on at least one side of the stacker in the direction of tray movement when the tray is held in the storage position.

5. The media processing device described in claim 3, wherein:
the stacker comprises at least one media holding part that holds an outside edge of the media and is formed between a bottom and an open end of the stacker; and
an open end of the media holding part of the stacker is larger than a bottom of the media holding part.

6. The media processing device described in claim 5, wherein:
a first support unit that supports the media in a prescribed area in a center of the media is formed on the bottom of the stacker.

7. The media processing device described in claim 5, wherein:
at least one second support unit positioned at an outside edge surface part of the media is disposed on the bottom of the stacker.

8. The media processing device described in claim 1, wherein:
a center of the media guide part is on a path of rotation of the media transportation mechanism.

9. The media processing device described in claim 1, wherein:
a removal recess for removing the media is disposed at a periphery of a bottom part of the stacker.

10. The media processing device described in claim 9, wherein:
the tray is formed so that when the tray is in the pulled out position the removal recess is pulled out outside of said media processing device.

11. The media processing device described in claim 1, wherein:
a shock absorber is disposed on at least one of a storage limiting part that is disposed on a tray holding unit side of the tray holding unit and said storage limiting part contacts the tray when the tray is stored, and a tray storage stop that is disposed on the tray and contacts said storage limiting part.

12. The media processing device described in claim 1, wherein:
a shock absorber is disposed on at least one of a pull-out stopping part that is disposed on a tray holding unit side of the tray, said shock absorber contacts the tray when the tray is pulled out, and prevents pulling of the tray completely out, and a tray pull-out stop that is disposed on the tray and contacts said pull-out limiting part.

13. A media processing device, comprising:
a chassis;
a tray having a stacker for storing media;
a tray holding unit that holds the tray movably between a pulled-out position and a storage position;
wherein a land part is formed on a first surface of at least one of the tray and the tray holding unit, and a channel part is formed on at least part of an opposing surface of the first surface;
a media guide part that guides the media to the stacker and is disposed on the chassis;
an urging member that pushes toward a side of the tray is disposed on a side part of the tray holding unit; and
a side part of the tray that contacts the urging member is sloped so that the width of the tray through said side part narrows in a front of the tray and widens in a back of said tray;
an inside diameter of the media guide part on an opposite end as the stacker is greater than an inside diameter of the media guide part at the stacker end,
an inside diameter of an end of the stacker open to the media holding part is greater than an inside diameter of an end of the stacker at the media guide part, and
an inside diameter of the stacker on a bottom side of the media holding part is substantially equal to the inside diameter of a stacker side end of the media guide part.

14. The media processing device described in claim 13, wherein:

a recess that fits the urging member is disposed at a prescribed position on the side of the tray.

15. The media processing device described in claim 13, wherein:
a protruding surface part is disposed on the side of the tray that contacts the urging member at a position offset from a front part of said tray.

16. The media processing device described in claim 13, wherein:
a roller that rolls against the side of the tray is disposed on the urging member.

17. The media processing device described in claim 13, wherein the land part includes a plurality of land parts and the channel part includes a plurality of channel parts.

\* \* \* \* \*